US010867370B2

(12) United States Patent
Ferrés et al.

(10) Patent No.: US 10,867,370 B2
(45) Date of Patent: Dec. 15, 2020

(54) MULTISCALE DENOISING OF VIDEOS

(71) Applicant: GoPro, Inc., San Mateo, CA (US)

(72) Inventors: Matias Tassano Ferrés, Paris (FR); Thomas Nicolas Emmanuel Veit, Meudon (FR); Julie Delon, Paris (FR)

(73) Assignee: GoPro, Inc., San Mateo, CA (US)

( * ) Notice: Subject to any disclaimer, the term of this patent is extended or adjusted under 35 U.S.C. 154(b) by 224 days.

(21) Appl. No.: 16/185,779

(22) Filed: Nov. 9, 2018

(65) Prior Publication Data

US 2020/0151854 A1    May 14, 2020

(51) Int. Cl.
*G06K 9/36* (2006.01)
*G06T 5/00* (2006.01)
*G06T 3/40* (2006.01)
*G06T 5/50* (2006.01)

(52) U.S. Cl.
CPC ............ *G06T 5/002* (2013.01); *G06T 3/4084* (2013.01); *G06T 5/50* (2013.01); *G06T 2207/10016* (2013.01); *G06T 2207/20016* (2013.01); *G06T 2207/20182* (2013.01); *G06T 2207/20224* (2013.01)

(58) Field of Classification Search
CPC ...... H04N 19/85; H04N 19/423; H04N 19/88; G06K 9/00597; G06K 9/00771
USPC ............ 382/276, 275, 232, 100; 375/240.12, 375/E7.26, E7.079; 704/500
See application file for complete search history.

(56) References Cited

U.S. PATENT DOCUMENTS 8,542,737 B2 * 9/2013 Dvir ...................... H04N 19/61
375/240.12
10,735,769 B2 * 8/2020 Levy .................... H04N 19/137

OTHER PUBLICATIONS

M Lebrun, M Colom, A Buades, and J M Morel. Secrets of image denoising cuisine. Acta Numerica, 21:475-576, 2012.
Julien Mairal, Guillermo Sapiro, and Michael Elad. Learning Multiscale Sparse Representations for Image and Video Restoration. Multiscale Modeling & Simulation, 7(1):214-241, 2008.
M Elad and M Aharon. Image denoising via sparse and redundant representation over learned dictionaries. IEEE Transactions on Image Processing, 15(12):3736-3745, 2006.
(Continued)

*Primary Examiner* — Charlotte M Baker
(74) *Attorney, Agent, or Firm* — Young Basile Hanlon & MacFarlane, P.C.

(57) ABSTRACT

Implementations disclosed herein include an image capture device, a system, and a method for performing multiscale denoising of a video. An image processor of the image capture device obtains a video frame. The video frame may be in any format and may include noise artifacts. The image processor decomposes the video frame into one or more sub-frames. In some implementations, the image processor denoises each of the one or more sub-frames. The image processor decomposes one or more video frames in a temporal buffer into one or more temporal sub-frames. The image processor denoises each of the temporal sub-frames. The image processor reconstructs the one or more denoised sub-frames and the one or more temporal sub-frames to produce a denoised video frame. A memory of the image capture device may be configured to store the denoised video frame.

20 Claims, 9 Drawing Sheets

(56) References Cited

OTHER PUBLICATIONS

Peter Burt and Edward Adelson. The Laplacian pyramid as a compact image code. IEEE Transactions on communications, 31(4):532-540, 1983.

Mauricio Delbracio, Pablo Musé, Antoni Buades, Julien Chauvier, Nicholas Phelps, and Jean-Michel Morel. Boosting monte carlo rendering by ray histogram fusion. ACM Transactions on Graphics, 33(1):1-15, 2014.

Antoni Buades, Bartomeu Coll, Jean-michel Morel, Antoni Buades, Bartomeu Coll, Jean-michel Morel Nonlocal, and Antoni Buades. NonLocal image and movie denoising. International Journal of Computer Vision, 76(2):123-139, 2008.

Kostadin Dabov, Alessandro Foi, Vladimir Katkovnik, and Karen Egiazarian. Video denoising by sparse 3D transform-domain collaborative filtering.

\* cited by examiner

MULTISCALE DENOISING OF VIDEOS

TECHNICAL FIELD

This disclosure relates to denoising systems and methods in image and video processing.

BACKGROUND

Noise artifacts exist in videos that make for undesirable viewing. Typical patch-based denoising algorithms cannot cope with low-frequency noise, which is particularly noticeable in the eyes of the viewer. Patch-based methods fail at removing long-wavelength noise, as large structures cannot be captured by small patches. Systems and methods to improve video denoising are needed.

SUMMARY

Implementations disclosed herein include a method for denoising a video frame. The video frame may be a raw image or an image in any format that includes noise artifacts. A method for denoising an input video frame may include obtaining an input video frame. The method may include obtaining a temporal buffer. The temporal buffer may be associated with the input video frame and include one or more temporally preceding video frames relative to the input video frame, one or more temporally subsequent video frames relative to the input video frame, or both. The method may include decomposing the input video frame into one or more sub-frames. The one or more sub-frames may range from a coarse scale to a fine scale. The method may include denoising each of the one or more sub-frames. The denoising of each of the one or more sub-frames may be performed independently from the coarse scale to the fine scale. The method may include decomposing the temporally preceding video frame, the temporally subsequent video frame, or both, into one or more respective temporal sub-frames. The one or more respective temporal sub-frames may range from a coarse scale to a fine scale. The method may include denoising each of the one or more respective temporal sub-frames. The denoising of each of the one or more respective temporal sub-frames may be performed independently from the coarse scale to the fine scale. The method may include reconstructing a denoised video frame based on the one or more denoised sub-frames, the one or more denoised respective temporal sub-frames, or both.

Implementations disclosed herein include an image capture device configured to denoise a video frame. The image capture device may include an image sensor configured to obtain an input video frame. The image capture device may include a first memory configured to store a temporal buffer. The temporal buffer may include one or more temporally preceding video frames relative to the input video frame, one or more temporally subsequent video frames relative to the input video frame, or both.

The image capture device may include an image processor configured to decompose the input video frame into one or more sub-frames. The image processor may be configured to denoise each of the one or more sub-frames. The image processor may be configured to decompose the one or more temporally preceding video frames, the one or more temporally subsequent video frames, or both, into one or more respective temporal sub-frames. The image processor may be configured to denoise each of the one or more respective temporal sub-frames. The image processor may be configured to reconstruct a denoised video frame based on the one or more denoised sub-frames, the one or more denoised respective temporal sub-frames, or both. The image capture device may include a display unit configured to display the denoised video frame. The image capture device may include a second memory configured to store the denoised video frame. In some implementations, the first memory may be configured to store the denoised video frame.

Implementations disclosed herein include an image capture device configured to denoise a video frame. The image capture device may include an image sensor configured to obtain an input video frame. The image capture device may include a memory configured to store a temporal buffer. The temporal buffer may include one or more temporally preceding video frames relative to the input video frame, one or more temporally subsequent video frames relative to the input video frame, or both.

The image capture device may include an image processor configured to transform the input video frame, the temporally preceding video frame, the temporally subsequent video frame, or any combination thereof, from a misaligned four-channel image to a respective three-channel centered video frame. Each respective three-channel centered video frame may have an RGB color space. The image processor may be configured to determine, for each of the input video frame, the temporally preceding video frame, the temporally subsequent video frame, or any combination thereof, a first noise estimate based on each respective three-channel centered video frame. The image processor may be configured to multiply each channel of each respective three-channel centered video frame by a respective weight to adjust a white balance of each respective three-channel centered video frame. The image processor may be configured to determine a second noise estimate based on each respective three-channel centered video frame and each respective white balance adjusted video frame. The image processor may be configured to transform, for each of the input video frame, the temporally preceding video frame, the temporally subsequent video frame, or any combination thereof, the RGB color space to a YCbCr color space to produce a respective color transformed video frame. The image processor may be configured to determine a third noise estimate based on each respective white balance adjusted video frame and each respective color transformed video frame.

The image processor may be configured to decompose each respective color transformed video frame into one or more sub-frames. The one or more sub-frames may range from a coarse scale to a fine scale. The image processor may be configured to determine a respective noise estimate for each of the one or more sub-frames. In an example, each respective noise estimate may be based on a frame at a present scale and an image of an adjacent scale. The image processor may be configured to denoise each of the one or more sub-frames. The image processor may be configured to denoise each of the one or more sub-frames independently from the coarse scale to the fine scale. The image processor may be configured to reconstruct the one or more denoised sub-frames to produce a denoised video frame. The image processor may be configured to transform the YCbCr color space of the denoised video frame to the RGB color space to produce an inverse color space transformed video frame. The image processor may be configured to transform the inverse color space transformed video frame to a Bayer scale video frame. The image capture device may be configured to store the Bayer scale video frame in the memory. In some implementations, the image capture device may include a second memory that is configured to store the Bayer scale video frame.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1A:
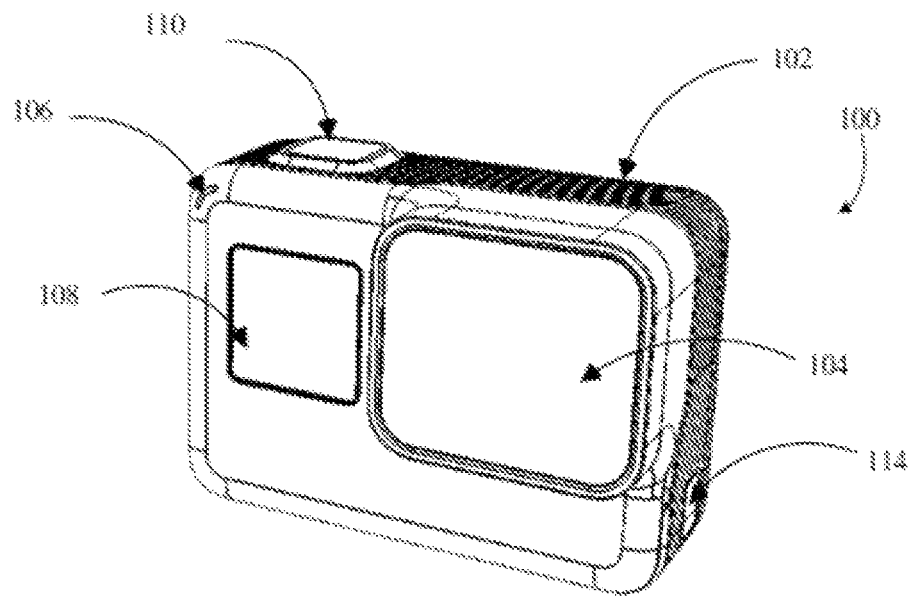
FIG. 1A is an isometric view of an image capture device in accordance with implementations of this disclosure.
Figure 1B:
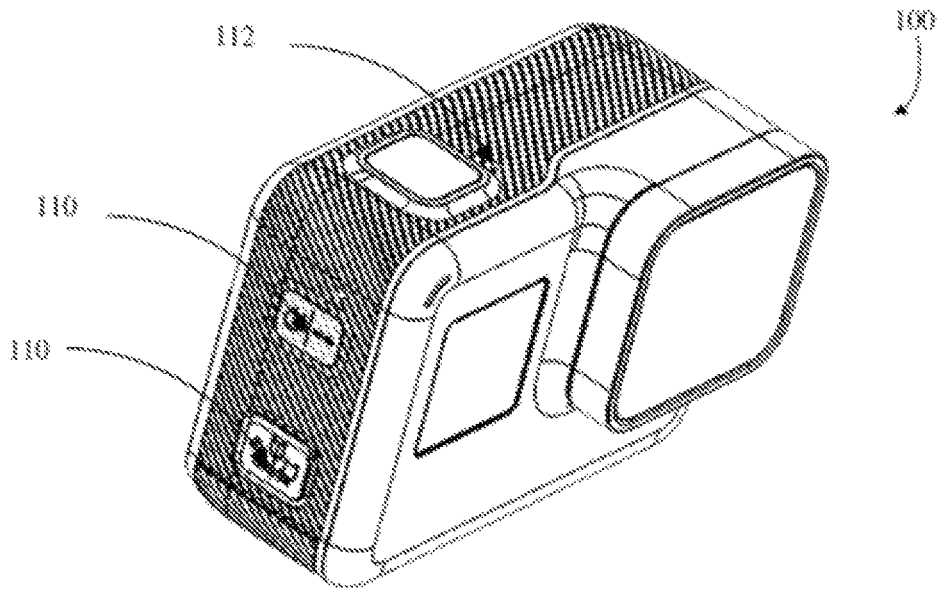
FIG. 1B is an isometric view of an image capture device in accordance with implementations of this disclosure.
Figure 1C:
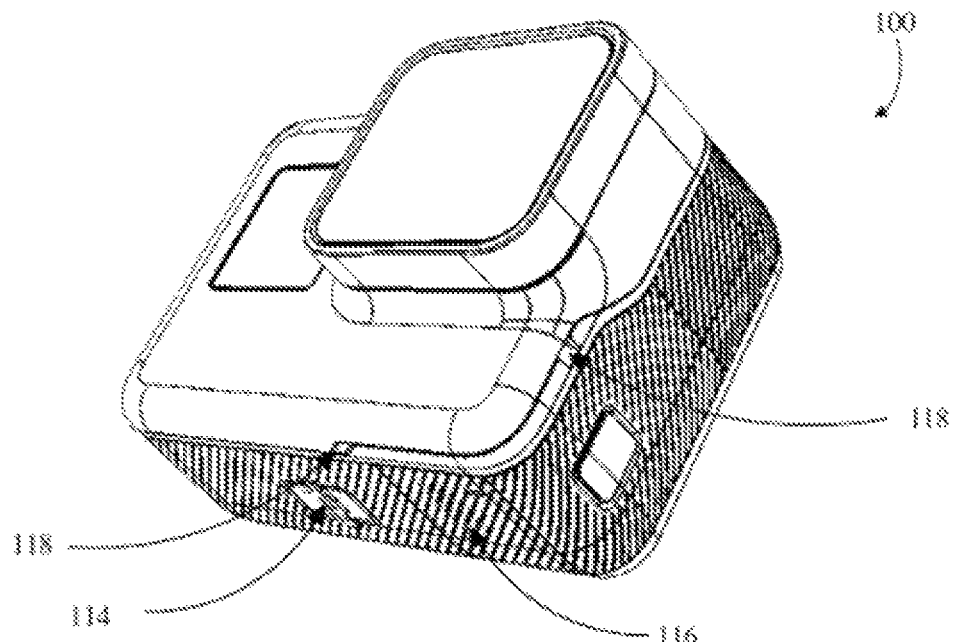
FIG. 1C is an isometric view of an image capture device in accordance with implementations of this disclosure.
Figure 1D:
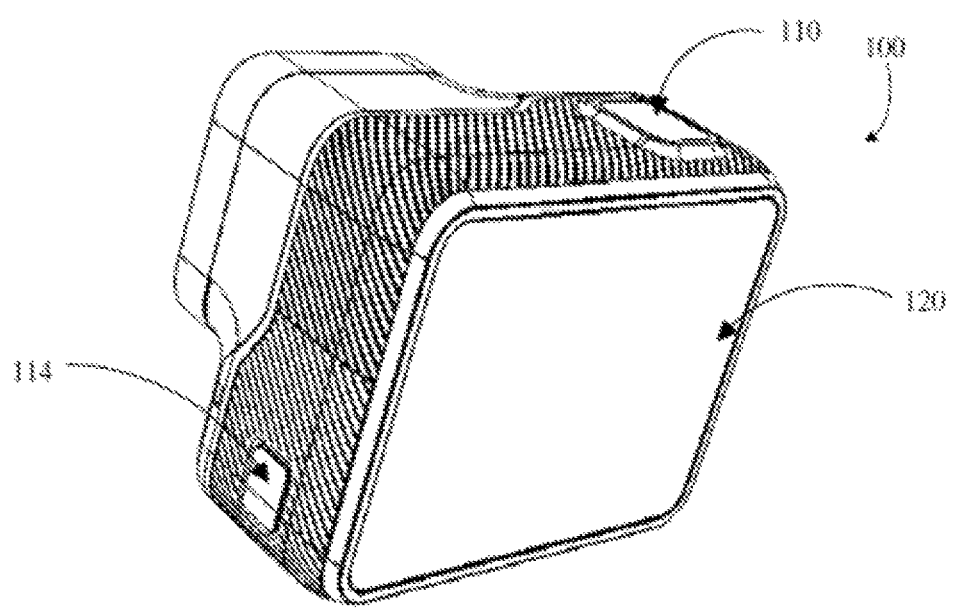
FIG. 1D is an isometric view of an image capture device in accordance with implementations of this disclosure.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation as is permitted under the law so as to encompass all such modifications and equivalent arrangements.

Typical patch-based denoising algorithms cannot cope with low-frequency noise, which is particularly noticeable in the eyes of the viewer. Patch-based methods fail at removing long-wavelength noise, as large structures cannot be captured by small patches. A possible approach to dealing with low-frequency noise is to apply a multiscale decomposition to the image and progressively denoise its scales. Because of the downsampling process involved in multiscaling, noise will decrease at coarser scales, which facilitates the task of the denoising algorithms. In addition, the relative sizes of the neighborhoods will widen in coarser scales due to subsampling, which allows the capture and removal of low-frequency noise in larger regions. The main difficulty involved in multiscale image denoising is related to the estimation of the noise in all the scales of the multiscale decomposition. This is mainly due to the subsequent correlation of spatially neighboring pixels in order to construct each scale of the decomposition.

Typical multiscale schemes may denoise a given scale, upscale the image, add the upscaled image to the sub-image in a finer scale, and denoise the finer scaled image. Video denoising methods disclosed herein may denoise each scale separately and then reconstruct a final result bottom-up using the denoised sub-frames. Video denoising methods may include denoising a reference patch (or window) in a reference frame using the information contained in a search region surrounding the reference patch. In addition, video denoising methods may include information contained in a number of consecutive frames in the input video. For example, the search region in video denoising methods includes a spatiotemporal volume. The spatiotemporal volume is a three-dimensional search region that may be centered in the reference patch, and may be the union of the spatial search regions located in the same spatial location in the frames considered. The set of consecutive frames, excepting the reference frame, may be referred to as a temporal buffer. The video denoising methods disclosed herein employ a spatiotemporal multiscale method that integrates spatiotemporal denoising in each scale of a pyramid. In the examples disclosed herein, any type of denoising method may be applied, such as Video Non-local Means (VNLM).

FIGS. 1A-1D illustrate an embodiment of an example image capture device 100 that may include an audio system for use in a submersible camera system. The image capture device 100 may include a body 102 having a lens 104 structured on a front surface of the body 102, various indicators on the front of the surface of the body 102 (such as LEDs, displays, and the like), various input mechanisms (such as buttons, switches, and touchscreen mechanisms), and electronics (e.g., imaging electronics, power electronics, etc.) internal to the body 102 for capturing images via the lens 104 and/or performing other functions. The image capture device 100 may be configured to capture images and video, and to store captured images and video for subsequent display or playback.

The image capture device 100 can include various indicators, including the LED lights 106 and the LED display 108. The image capture device 100 can also include buttons 110 configured to allow a user of the image capture device 100 to interact with the image capture device 100, to turn the image capture device 100 on, and to otherwise configure the operating mode of the image capture device 100. The image capture device 100 can also include a microphone 112 configured to receive and record audio signals in conjunction with recording video. The side of the image capture device 100 may include an I/O interface 114. The camera may also include a microphone 116 system integrated into the camera housing. The front surface of the camera may include two drainage ports as part of a drainage channel 118 for the camera audio system. The camera can include a user interface 120 that allows for interaction with the camera while simultaneously displaying camera information on a surface of the camera. As illustrated, the image capture device 100 may include a lens 104 configured to receive light incident upon the lens and to direct received light onto an image sensor internal to the lens.

The image capture device 100 includes a camera exterior that encompasses and protects the camera's internal electronics, which are further described in later sections. The camera exterior includes 6 surfaces (i.e., a front face, a left face, a right face, a back face, a top face, and a bottom face), wherein the exterior surfaces form a rectangular cuboid. Furthermore, both the front and rear surfaces of the image capture device 100 are substantially rectangular in shape. The image capture device 100 can be made of a rigid material such as plastic, aluminum, steel, or fiberglass. Additional camera features, such as the features described above, may be affixed to an exterior of the camera. In some embodiments, the camera described herein includes features other than those described below. For example, instead of a single interface button, the camera can include additional buttons or different interface features, such as multiple microphone openings to receive voice or other audio commands.

Although not expressly shown in FIGS. 1A-1D, in some implementations, the image capture device 100 may include one or more image sensors, such as a charge-coupled device (CCD) sensor, an active pixel sensor (APS), a complementary metal-oxide-semiconductor (CMOS) sensor, an N-type metal-oxide-semiconductor (NMOS) sensor, and/or any other image sensor or combination of image sensors.

Although not expressly shown in FIGS. 1A-1D, in some implementations, the image capture device 100 may include one or more microphones, which may receive, capture, and record audio information, which may be associated with images acquired by the image sensors.

Although not expressly shown in FIGS. 1A-1D, the image capture device 100 may include one or more other information sources or sensors, such as an inertial measurement unit (IMU), a global positioning system (GPS) receiver component, a pressure sensor, a temperature sensor, a heart rate sensor, or any other unit, or combination of units, that may be included in an image capture device.

In some implementations, the image capture device 100 may interface with or communicate with an external device, such as the external user interface (UI) device 120, via a wired (not shown) or wireless (as shown) computing communication link 160. Although a single computing communication link 160 is shown in FIGS. 1A-1D for simplicity, any number of computing communication links may be used. Although the computing communication link 160 shown in FIGS. 1A-1D is shown as a direct computing communication link, an indirect computing communication link, such as a link including another device or a network, such as the Internet, may be used. In some implementations, the computing communication link 160 may be a Wi-Fi link, an infrared link, a Bluetooth (BT) link, a cellular link, a ZigBee link, a near-field communications (NFC) link (such as an ISO/IEC 23243 protocol link), an Advanced Network Technology interoperability (ANT+) link, and/or any other wireless communication link or combination of links. In some implementations, the computing communication link 160 may be an HDMI link, a USB link, a digital video interface link, a display port interface link (such as a Video Electronics Standards Association (VESA) digital display interface link), an Ethernet link, a Thunderbolt link, and/or other wired computing communication link.

In some implementations, the user interface device 120 may be a computing device, such as a smartphone, a tablet computer, a phablet, a smart watch, a portable computer, and/or another device or combination of devices configured to receive user input, communicate information with the image capture device 100 via the computing communication link 160, or receive user input and communicate information with the image capture device 100 via the computing communication link 160.

In some implementations, the image capture device 100 may transmit images or video (or portions thereof), such as panoramic images, to the user interface device 120 via the computing communication link 160, and the user interface device 120 may store, process, display, or a combination thereof the panoramic images.

In some implementations, the user interface device 120 may display, or otherwise present, content, such as images or video, acquired by the image capture device 100. For example, a display of the user interface device 120 may be a viewport into the three-dimensional space represented by the panoramic images or video captured or created by the image capture device 100.

In some implementations, the user interface device 120 may communicate information, such as metadata, to the image capture device 100. For example, the user interface device 120 may send orientation information of the user interface device 120 with respect to a defined coordinate system to the image capture device 100, such that the image capture device 100 may determine an orientation of the user interface device 120 relative to the image capture device 100. Based on the determined orientation, the image capture device 100 may identify a portion of the panoramic images or video captured by the image capture device 100 for the image capture device 100 to send to the user interface device 120 for presentation as the viewport. In some implementations, based on the determined orientation, the image capture device 100 may determine the location of the user interface device 120 and/or the dimensions for viewing of a portion of the panoramic images or video.

In an example, a user may rotate (sweep) the user interface device 120 through an arc or path 122 in space, as indicated by the arrow shown at 122 in FIG. 1. The user interface device 120 may communicate display orientation information to the image capture device 100 using a communication interface such as the computing communication link 160. The image capture device 100 may provide an encoded bitstream to enable viewing of a portion of the panoramic content corresponding to a portion of the environment of the display location as the image capture device 100 traverses the path 122. Accordingly, display orientation information from the user interface device 120 may be transmitted to the image capture device 100 to control user selectable viewing of captured images and/or video.

In some implementations, the image capture device 100 may communicate with one or more other external devices (not shown) via wired or wireless computing communication links (not shown).

In some implementations, data, such as image data, audio data, and/or other data, obtained by the image capture device 100 may be incorporated into a combined multimedia stream. For example, the multimedia stream may include a video track and/or an audio track. As another example, information from various metadata sensors and/or sources within and/or coupled to the image capture device 100 may be processed to produce a metadata track associated with the video and/or audio track. The metadata track may include metadata, such as white balance metadata, image sensor gain metadata, sensor temperature metadata, exposure time metadata, lens aperture metadata, bracketing configuration metadata and/or other parameters. In some implementations, a multiplexed stream may be generated to incorporate a video and/or audio track and one or more metadata tracks.

In some implementations, the user interface device 120 may implement or execute one or more applications to manage or control the image capture device 100. For example, the user interface device 120 may include an application for controlling camera configuration, video acquisition, video display, or any other configurable or controllable aspect of the image capture device 100.

In some implementations, the user interface device 120 may, such as via an application, generate and share, such as via a cloud-based or social media service, one or more images or short video clips, such as in response to user input. In some implementations, the user interface device 120 may, such as via an application, remotely control the image capture device 100, such as in response to user input.

In some implementations, the user interface device 120 may, such as via an application, display unprocessed or minimally processed images or video captured by the image capture device 100 contemporaneously with capturing the images or video by the image capture device 100, such as for shot framing, which may be referred to herein as a live preview, and which may be performed in response to user input. In some implementations, the user interface device 120 may, such as via an application, mark one or more key moments contemporaneously with capturing the images or video by the image capture device 100, such as with a tag, such as in response to user input.

In some implementations, the user interface device 120 may, such as via an application, display or otherwise present marks or tags associated with images or video, such as in response to user input. For example, marks may be presented in a camera roll application for location review and/or playback of video highlights.

In some implementations, the user interface device 120 may, such as via an application, wirelessly control camera software, hardware, or both. For example, the user interface device 120 may include a web-based graphical interface accessible by a user for selecting a live or previously recorded video stream from the image capture device 100 for display on the user interface device 120.

In some implementations, the user interface device 120 may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2:
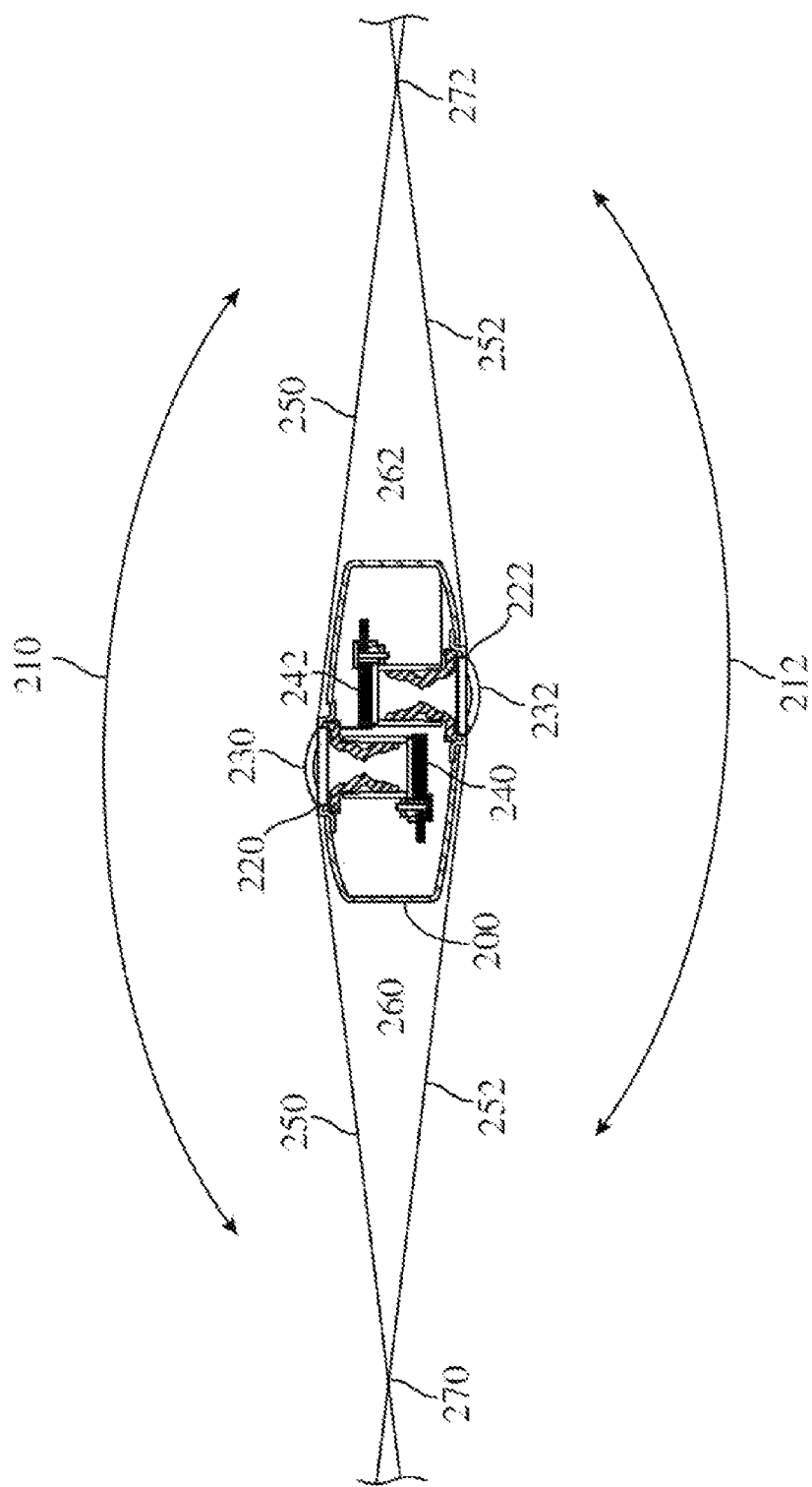
FIG. 2 is a cross-sectional view of an example of an image capture device including overlapping fields-of-view in accordance with implementations of this disclosure.

FIG. 2 is a cross-sectional view of an example of a dual-lens image capture device 200 including overlapping fields-of-view 210, 212 in accordance with implementations of this disclosure. In some implementations, the image capture device 200 may be a spherical image capture device with fields-of-view 210, 212 as shown in FIG. 2. For example, the image capture device 200 may include image capture devices 220, 222, related components, or a combination thereof, arranged in a back-to-back or Janus configuration. For example, a first image capture device 220 may include a first lens 230 and a first image sensor 240, and a second image capture device 222 may include a second lens 232 and a second image sensor 242 arranged oppositely from the first lens 230 and the first image sensor 240.

The first lens 230 of the image capture device 200 may have the field-of-view 210 shown above a boundary 250. Behind the first lens 230, the first image sensor 240 may capture a first hyper-hemispherical image plane from light entering the first lens 230, corresponding to the first field-of-view 210.

The second lens 232 of the image capture device 200 may (as shown) have a field-of-view 212 below a boundary 252. Behind the second lens 232, the second image sensor 242 may capture a second hyper-hemispherical image plane from light entering the second lens 232, corresponding to the second field-of-view 212.

One or more areas, such as blind spots 260, 262, may be outside of the fields-of-view 210, 212 of the lenses 230, 232; light may be obscured from the lenses 230, 232 and the corresponding image sensors 240, 242; and content in the blind spots 260, 262 may be omitted from capture. In some implementations, the image capture device 200 may be configured to minimize the blind spots 260, 262.

The fields-of-view 210, 212 may overlap. Stitch points 270, 272, proximal to the image capture device 200, at which the fields-of-view 210, 212 overlap, may be referred to herein as overlap points or stitch points. Content captured by the respective lenses 230, 232, distal to the stitch points 270, 272, may overlap.

Images and video frames contemporaneously captured by the respective image sensors 240, 242 may be combined to form a combined image. Combining the respective images may include correlating the overlapping regions captured by the respective image sensors 240, 242, aligning the captured fields-of-view 210, 212, and stitching the images or video frames together to form a cohesive combined image or video frame.

A small change in the alignment, such as position and/or tilt, of the lenses 230, 232, the image sensors 240, 242, or both may change the relative positions of their respective fields-of-view 210, 212 and the locations of the stitch points 270, 272. A change in alignment may affect the size of the blind spots 260, 262, which may include changing the size of the blind spots 260, 262 unequally.

Incomplete or inaccurate information indicating the alignment of the image capture devices 220, 222, such as the locations of the stitch points 270, 272, may decrease the accuracy, efficiency, or both of generating a combined image. In some implementations, the image capture device 200 may maintain information indicating the location and orientation of the lenses 230, 232 and the image sensors 240, 242 such that the fields-of-view 210, 212, the stitch points 270, 272, or both may be accurately determined, which may improve the accuracy, efficiency, or both of generating a combined image or video frame.

Optical axes through the lenses 230, 232 may be substantially antiparallel to each other, such that the respective axes may be within a tolerance such as 1%, 3%, 5%, 10%, and/or other tolerances. In some implementations, the image sensors 240, 242 may be substantially perpendicular to the optical axes through their respective lenses 230, 232, such that the image sensors may be perpendicular to the respective axes to within a tolerance such as 1%, 3%, 5%, 10%, and/or other tolerances.

The lenses 230, 232 may be laterally offset from each other, may be off-center from a central axis of the image capture device 200, or may be laterally offset and off-center from the central axis. As compared to an image capture device with back-to-back lenses, such as lenses aligned along the same axis, the image capture device 200 including laterally offset lenses 230, 232 may include substantially reduced thickness relative to the lengths of the lens barrels securing the lenses 230, 232. For example, the overall thickness of the image capture device 200 may be close to the length of a single lens barrel as opposed to twice the length of a single lens barrel as in a back-to-back configuration. Reducing the lateral distance between the lenses 230, 232 may improve the overlap in the fields-of-view 210, 212.

Images or video frames captured by an image capture device, such as the image capture device 100 shown in FIGS. 1A-1D and the image capture device 200 shown in FIG. 2, may be combined, merged, or stitched together to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

Figure 3:
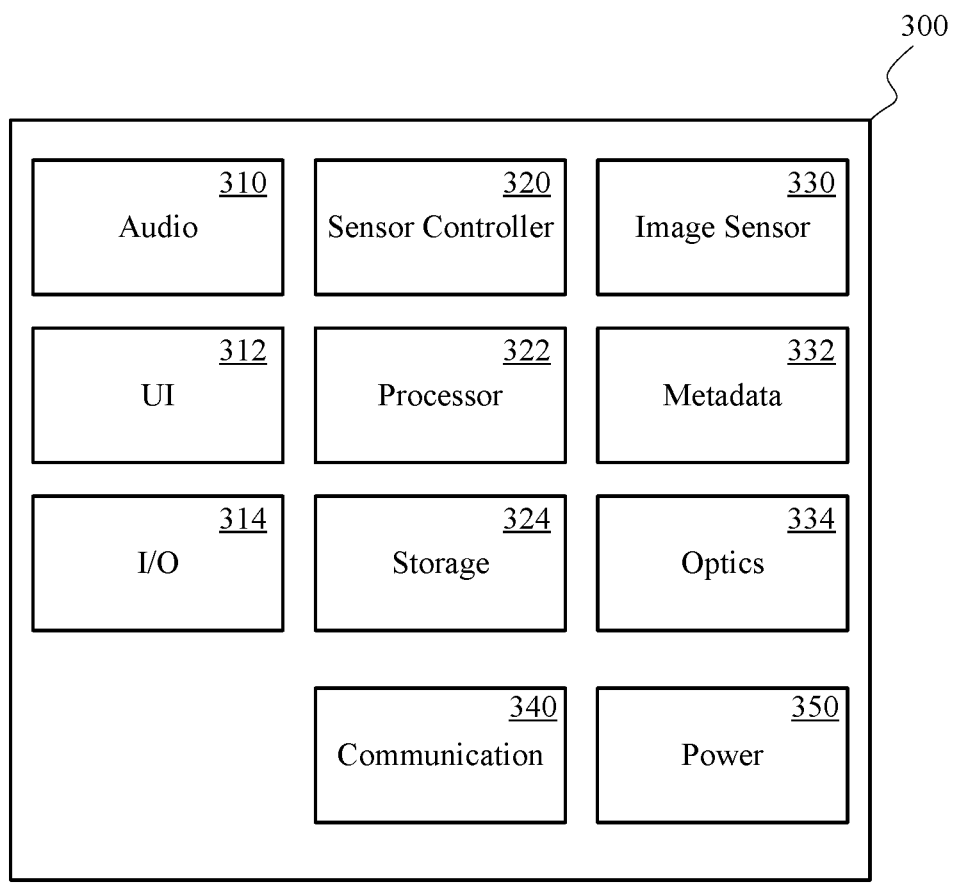
FIG. 3 is a diagram of an example of an image signal processor in accordance with implementations of this disclosure.

FIG. 3 is a diagram of an example of an image capture device 300. In some implementations, an image capture device 300 may be an action camera that includes an audio component 310, a user interface (UI) unit 312, an input/output (I/O) unit 314, a sensor controller 320, a processor 322, an electronic storage unit 324, an image sensor 330, a metadata unit 332, an optics unit 334, a communication unit 340, a power system 350, or a combination thereof.

In some implementations, the audio component 310, which may include a microphone, may receive, sample, capture, record, or a combination thereof, audio information, such as sound waves. The audio information may be associated with, or stored in association with, image or video content contemporaneously captured by the image capture device 300. In some implementations, audio information may be encoded using, for example, Advanced Audio Coding (AAC), Audio Compression-3 (AC3), Moving Picture Experts Group Layer-3 Audio (MP3), linear Pulse Code Modulation (PCM), Moving Picture Experts Group-High efficiency coding and media delivery in heterogeneous environments (MPEG-H), and/or other audio coding formats or codecs. In one or more implementations of spherical video and/or audio, the audio codec may include a three-dimensional audio codec, such as Ambisonics. For example, an Ambisonics codec can produce full surround audio including a height dimension. Using a G-format Ambisonics codec, a special decoder may be omitted.

In some implementations, the user interface unit 312 may include one or more units that may register or receive input from and/or present outputs to a user, such as a display, a touch interface, a proximity-sensitive interface, a light receiving/emitting unit, a sound receiving/emitting unit, a wired/wireless unit, and/or other units. In some implementations, the user interface unit 312 may include a display, one or more tactile elements (such as buttons and/or virtual touchscreen buttons), lights (LEDs), speakers, and/or other user interface elements. The user interface unit 312 may receive user input and/or provide information to a user related to the operation of the image capture device 300.

In some implementations, the user interface unit 312 may include a display unit that presents information related to camera control or use, such as operation mode information, which may include image resolution information, frame rate information, capture mode information, sensor mode information, video mode information, photo mode information, or a combination thereof; connection status information, such as connected, wireless, wired, or a combination thereof; power mode information, such as standby mode information, sensor mode information, video mode information, or a combination thereof; information related to other information sources, such as heart rate information, global positioning system information, or a combination thereof; and/or other information.

In some implementations, the user interface unit 312 may include a user interface component, such as one or more buttons, which may be operated, such as by a user, to control camera operations, such as to start, stop, pause, and/or resume sensor and/or content capture. The camera control associated with respective user interface operations may be defined. For example, the camera control associated with respective user interface operations may be defined based on the duration of a button press, which may be pulse width modulation; a number of button presses, which may be pulse code modulation; or a combination thereof. In an example, a sensor acquisition mode may be initiated in response to detecting two short button presses. In another example, the initiation of a video mode and cessation of a photo mode, or the initiation of a photo mode and cessation of a video mode, may be triggered or toggled in response to a single short button press. In another example, video or photo capture for a given time duration or a number of frames, such as burst capture, may be triggered in response to a single short button press. Other user command or communication implementations, such as one or more short or long button presses, may also be implemented.

In some implementations, the I/O unit 314 may synchronize the image capture device 300 with other cameras and/or with other external devices, such as a remote control, a second image capture device, a smartphone, a user interface device, and/or a video server. The I/O unit 314 may communicate information between I/O components. In some implementations, the I/O unit 314 may be connected to the communication unit 340 to provide a wired and/or wireless communications interface (e.g., a Wi-Fi interface, a Bluetooth interface, a USB interface, an HDMI interface, a Wireless USB interface, an NFC interface, an Ethernet interface, a radio frequency transceiver interface, and/or other interfaces) for communication with one or more external devices (e.g., a mobile device) or another metadata source. In some implementations, the I/O unit 314 may interface with LED lights, a display, a button, a microphone, speakers, and/or other I/O components. In some implementations, the I/O unit 314 may interface with an energy source, such as a battery, and/or a Direct Current (DC) electrical source.

In some implementations, the I/O unit 314 of the image capture device 300 may include one or more connections to external computerized devices for configuration and/or management of remote devices, as described herein. The I/O unit 314 may include any of the wireless or wireline interfaces described herein, and/or may include customized or proprietary connections for specific applications.

In some implementations, the sensor controller 320 may operate or control the image sensor 330, such as in response to input, such as user input. In some implementations, the sensor controller 320 may receive image and/or video input from the image sensor 330 and may receive audio information from the audio component 310.

In some implementations, the processor 322 may include a system on a chip (SOC), microcontroller, microprocessor, central processing unit (CPU), digital signal processor (DSP), application-specific integrated circuit (ASIC), graphics processing unit (GPU), and/or other processor that may control the operation and functionality of the image capture device 300. In some implementations, the processor 322 may interface with the sensor controller 320 to obtain and process sensory information, such as for object detection, face tracking, stereo vision, and/or other image processing.

In some implementations, the sensor controller 320, the processor 322, or both may synchronize information received by the image capture device 300. For example, timing information may be associated with received sensor data, and metadata information may be related to content, such as images or videos, captured by the image sensor 330 based on the timing information. In some implementations, the metadata capture may be decoupled from video/image capture. For example, metadata may be stored before, after, and in-between the capture, processing, or storage of one or more video clips and/or images.

In some implementations, the sensor controller 320, the processor 322, or both may evaluate or process received metadata and may generate other metadata information. For example, the sensor controller 320 may integrate received acceleration information to determine a velocity profile for the image capture device 300 concurrently with recording a video. In some implementations, video information may include multiple frames of pixels and may be encoded using an encoding method, such as H.264, H.265, CineForm, and/or other codecs.

Although not shown separately in FIG. 3, one or more of the audio component 310, the user interface unit 312, the I/O unit 314, the sensor controller 320, the processor 322, the electronic storage unit 324, the image sensor 330, the metadata unit 332, the optics unit 334, the communication unit 340, or the power systems 350 of the image capture device 300 may communicate information, power, or both with one or more other units, such as via an electronic communication pathway, such as a system bus. For example, the processor 322 may interface with the audio component 310, the user interface unit 312, the I/O unit 314, the sensor controller 320, the electronic storage unit 324, the image sensor 330, the metadata unit 332, the optics unit 334, the communication unit 340, or the power systems 350 via one or more driver interfaces and/or software abstraction layers. In some implementations, one or more of the units shown in FIG. 3 may include a dedicated processing unit, memory unit, or both (not shown). In some implementations, one or more components may be operable by one or more other control processes. For example, a global positioning system receiver may include a processing apparatus that may provide position and/or motion information to the processor 322 in accordance with a defined schedule, such as values of latitude, longitude, and elevation at 10 Hz.

In some implementations, the electronic storage unit 324 may include a system memory module that may store executable computer instructions that, when executed by the processor 322, perform various functionalities, including those described herein. For example, the electronic storage unit 324 may be a non-transitory computer-readable storage medium, which may include executable instructions, and a processor, such as the processor 322, may execute an instruction to perform one or more, or portions of one or more, of the operations described herein. The electronic storage unit 324 may include storage memory for storing content, such as metadata, images, audio, or a combination thereof, captured by the image capture device 300.

In some implementations, the electronic storage unit 324 may include non-transitory memory for storing configuration information and/or processing code for video information and metadata capture, and/or to produce a multimedia stream that may include video information and metadata in accordance with the present disclosure. The electronic storage unit 324 may include a temporal buffer. The temporal buffer includes temporal video frames, for example, video frames that are adjacent to the reference video frame (e.g., input video frame). In an example, an adjacent video frame may include a previous or subsequent video frame relative to the input video frame. In some implementations, the configuration information may include capture type, such as video or still image; image resolution; frame rate; burst setting; white balance; recording configuration, such as loop mode; audio track configuration; and/or other parameters that may be associated with audio, video, and/or metadata capture. In some implementations, the electronic storage unit 324 may include memory that may be used by other hardware/firmware/software elements of the image capture device 300.

In some implementations, the image sensor 330 may include one or more of a charge-coupled device sensor, an active pixel sensor, a complementary metal-oxide-semiconductor sensor, an N-type metal-oxide-semiconductor sensor, and/or another image sensor or combination of image sensors. In some implementations, the image sensor 330 may be controlled based on control signals from a sensor controller 320.

The image sensor 330 may sense or sample light waves gathered by the optics unit 334 and may produce image data or signals. The image sensor 330 may generate an output signal conveying visual information regarding the objects or other content corresponding to the light waves received by the optics unit 334. The visual information may include one or more of an image, a video, and/or other visual information.

In some implementations, the image sensor 330 may include a video sensor, an acoustic sensor, a capacitive sensor, a radio sensor, a vibrational sensor, an ultrasonic sensor, an infrared sensor, a radar sensor, a Light Detection and Ranging (LIDAR) sensor, a sonar sensor, or any other sensory unit or combination of sensory units capable of detecting or determining information in a computing environment.

In some implementations, the metadata unit 332 may include sensors, such as an inertial measurement unit, which may include one or more accelerometers, one or more gyroscopes, a magnetometer, a compass, a global positioning system sensor, an altimeter, an ambient light sensor, a temperature sensor, and/or other sensors or combinations of sensors. In some implementations, the image capture device 300 may contain one or more other sources of metadata information, telemetry, or both, such as image sensor parameters, battery monitor parameters, storage parameters, and/or other information related to camera operation and/or capture of content. The metadata unit 332 may obtain information related to the environment of the image capture device 300 and aspects in which the content is captured.

For example, the metadata unit 332 may include an accelerometer that may provide device motion information, including velocity and/or acceleration vectors representative of motion of the image capture device 300. In another example, the metadata unit 332 may include a gyroscope that may provide orientation information describing the orientation of the image capture device 300. In another example, the metadata unit 332 may include a global positioning system sensor that may provide global positioning system coordinates, time, and information identifying a location of the image capture device 300. In another example, the metadata unit 332 may include an altimeter that may obtain information indicating an altitude of the image capture device 300.

In some implementations, the metadata unit 332, or one or more portions thereof, may be rigidly coupled to the image capture device 300, such that motion, changes in orientation, or changes in the location of the image capture device 300 may be accurately detected by the metadata unit 332. Although shown as a single unit, the metadata unit 332, or one or more portions thereof, may be implemented as multiple distinct units. For example, the metadata unit 332 may include a temperature sensor as a first physical unit and a global positioning system unit as a second physical unit. In some implementations, the metadata unit 332, or one or more portions thereof, may be included in an image capture device 300 as shown or may be included in a physically separate unit operatively coupled to, such as in communication with, the image capture device 300.

In some implementations, the optics unit 334 may include one or more of a lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optics components. In some implementations, the optics unit 334 may include a focus controller unit that may control the operation and configuration of the camera lens. The optics unit 334 may receive light from an object and may focus received light onto an image sensor 330. Although not shown separately in FIG. 3, in some implementations, the optics unit 334 and the image sensor 330 may be combined, such as in a combined physical unit, for example, a housing.

In some implementations, the communication unit 340 may be coupled to the I/O unit 314 and may include a component, such as a dongle, having an infrared sensor, a radio frequency transceiver and antenna, an ultrasonic transducer, and/or other communications interfaces used to send and receive wireless communication signals. In some implementations, the communication unit 340 may include a local (such as Bluetooth or Wi-Fi) and/or broad range (such as cellular Long Term Evolution (LTE)) communications interface for communication between the image capture device 300 and a remote device, such as a mobile device. The communication unit 340 may communicate using, for example, Ethernet, 802.11, worldwide interoperability for microwave access (WiMAX), Third Generation Partnership Project (3GPP), LTE, digital subscriber line (DSL), asynchronous transfer mode (ATM), InfiniBand, PCI Express Advanced Switching, and/or other communication technologies. In some implementations, the communication unit 340 may communicate using networking protocols, such as multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged via the communication unit 340 may be represented using formats including one or more of hypertext markup language (HTML), extensible markup language (XML), and/or other formats. One or more exchanges of information between the image capture device 300 and remote or external devices may be encrypted using encryption technologies including one or more of secure sockets layer (SSL), transport layer security (TLS), virtual private networks (VPNs), Internet Protocol security (IPsec), and/or other encryption technologies.

In some implementations, the one or more power systems 350 supply power to the image capture device 300. For example, for a small-sized, lower-power action camera, a wireless power solution, such as a battery, a solar cell, an inductive (such as contactless) power source, rectification, and/or other power supply, may be used.

Consistent with the present disclosure, the components of the image capture device 300 may be remote from one another and/or aggregated. For example, one or more sensor components may be distal from the image capture device 300. Multiple mechanical, sensory, or electrical units may be controlled by a learning apparatus via network/radio connectivity.

Figure 4:
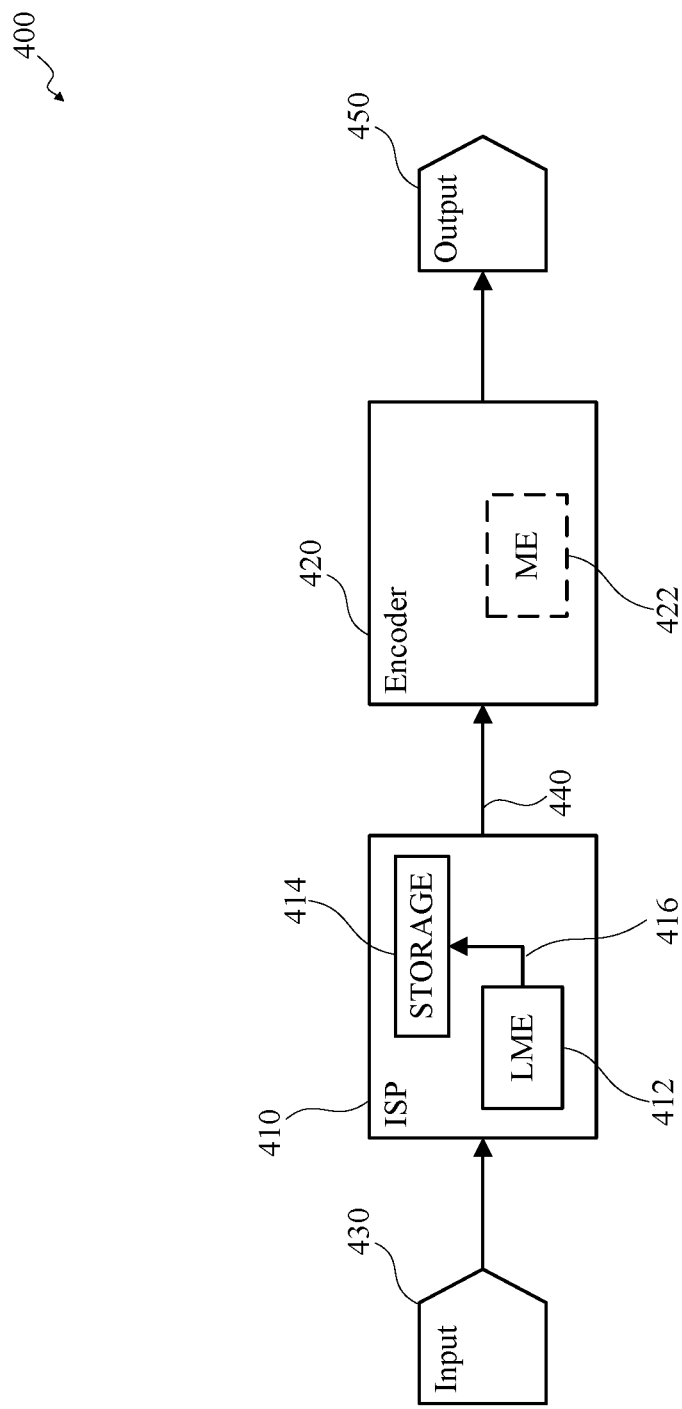
FIG. 4 is a diagram of an example of an image processing and coding pipe in accordance with implementations of this disclosure.

FIG. 4 is a block diagram of an example of an image processing and coding pipe 400 in accordance with implementations of this disclosure. In some implementations, the image processing and coding pipe 400 may be included in an image capture device, such as the image capture device 300 shown in FIG. 3. In some implementations, the image processing and coding pipe 400 may include an image signal processor (ISP) 410, an encoder 420, or a combination thereof.

In some implementations, the ISP 410 may receive an input image signal 430. For example, an image sensor (not shown), such as the image sensor 330 shown in FIG. 3, may capture an image or a portion thereof, and may send, or transmit, the captured image or frame to the ISP 410 as the input image signal 430. In some implementations, an image or frame, such as an image or frame included in the input image signal, may be one of a sequence or series of images or frames of a video, such as a sequence or series of frames captured at a rate, or frame rate, which may be a number or cardinality of frames captured per a defined temporal period, such as 24, 30, or 60 frames per second.

In some implementations, the ISP 410 may include a local motion estimation (LME) unit 412, which may generate local motion estimation information for use in image signal processing and encoding, such as in correcting distortion, stitching, and/or motion compensation. In some implementations, the local motion estimation unit 412 may partition the input image signal 430 into blocks, such as blocks having 4×4, 16×16, 64×64, and/or other dimensions. In some implementations, the local motion estimation unit 412 may partition the input image signal 430 into arbitrarily shaped patches and/or individual pixels.

In some implementations, the local motion estimation unit 412 may compare pixel values of blocks of pixels between image frames, such as successive image frames, from the input image signal 430 to determine displacement, or movement, between frames. The local motion estimation unit 412 may produce motion vectors, such as an x component and y component of motion, at multiple locations within an image frame. The motion vectors may be represented by a translational model or other models that may approximate camera motion, such as rotation and translation in three dimensions, and zooming.

In some implementations, the ISP 410 of the image processing and coding pipe 400 may include electronic storage 414, such as memory, such as random-access memory (RAM), flash memory, or other types of memory. The electronic storage 414 may store local motion estimation information 416 determined by the local motion estimation unit 412 for one or more frames. The local motion estimation information 416 and associated image or images may be output 440 to the encoder 420. In some implementations, the electronic storage 414 may include a buffer, or cache, and may buffer the input image signal as an input, or source, image or frame.

In some implementations, the ISP 410 may output an image, associated local motion estimation information 416, or both as the output 440. For example, the image signal processor 410 may receive the input image signal 430, process the input image signal 430, and output a processed image as the output 440. Processing the input image signal 430 may include generating and using the local motion estimation information 416, spatiotemporal noise reduction (3DNR), dynamic range enhancement, local tone adjustment, exposure adjustment, contrast adjustment, image stitching, and/or other operations.

The encoder 420 may encode or compress the output 440 of the ISP 410. In some implementations, the encoder 420 may implement the one or more encoding standards, which may include motion estimation.

In some implementations, the encoder 420 may output encoded video as an encoded output 450. For example, the encoder 420 may receive the output 440 of the ISP 410, which may include processed images, the local motion estimation information 416, or both. The encoder 420 may encode the images and may output the encoded images as the encoded output 450.

In some implementations, the encoder 420 may include a motion estimation unit 422 that may determine motion information for encoding the image output 440 of the ISP 410. In some implementations, the encoder 420 may encode the image output 440 of the ISP 410 using motion information generated by the motion estimation unit 422 of the encoder 420, the local motion estimation information 416 generated by the local motion estimation unit 412 of the ISP 410, or a combination thereof.

For example, the motion estimation unit 422 may determine motion information at pixel block sizes that may differ from pixel block sizes used by the local motion estimation unit 412. In another example, the motion estimation unit 422 of the encoder 420 may generate motion information, and the encoder may encode the image output 440 of the image signal processor 410 using the motion information generated by the motion estimation unit 422 of the encoder 420 and the local motion estimation information 416 generated by the local motion estimation unit 412 of the image signal processor 410. In another example, the motion estimation unit 422 of the encoder 420 may use the local motion estimation information 416 generated by the local motion estimation unit 412 of the image signal processor 410 as input for efficiently and accurately generating motion information.

In some implementations, the image signal processor 410, the encoder 420, or (as shown) both may be distinct units. For example, the image signal processor 410 may include a motion estimation unit, such as the local motion estimation unit 412 as shown, and/or the encoder 420 may include a motion estimation unit, such as the motion estimation unit 422.

In some implementations, the image signal processor 410 may store motion information, such as the local motion estimation information 416, in a memory, such as the electronic storage 414, and the encoder 420 may read the motion information from the electronic storage 414 or otherwise receive the motion information from the image signal processor 410. The encoder 420 may use the motion estimation information determined by the ISP 410 for motion compensation processing.

Figure 5:
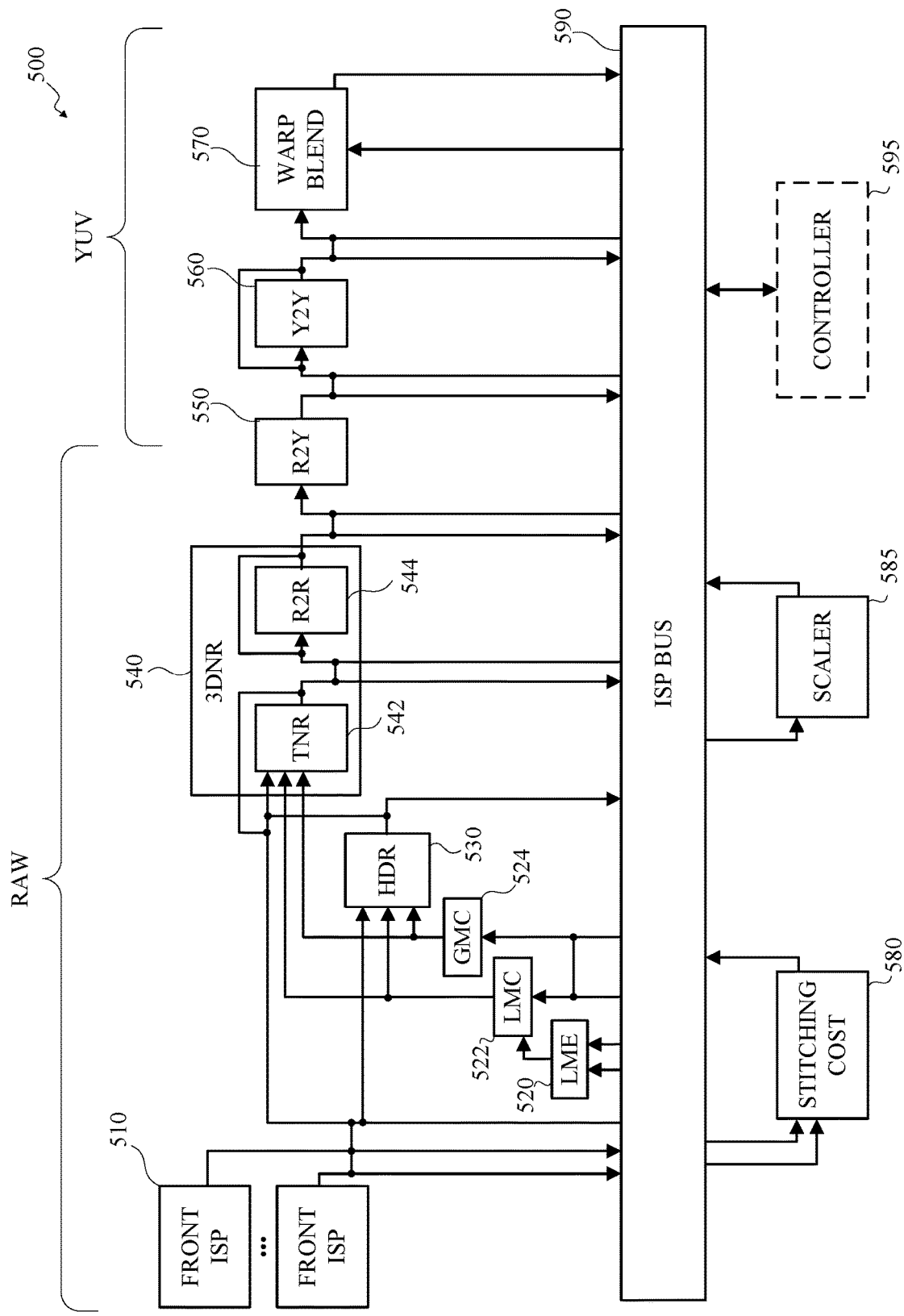
FIG. 5 is a block diagram of an image signal processor in accordance with implementations of this disclosure.

FIG. 5 is a functional block diagram of an example of an ISP 500 in accordance with implementations of this disclosure. An ISP 500 may be included in an image capture device, such as the image capture device 300 shown in FIG. 3. In some implementations, the ISP 500 may be similar to the ISP 410 shown in FIG. 4.

The ISP 500 may receive an image signal, such as from an image sensor (not shown), such as the image sensor 330 shown in FIG. 3, in a defined format, such as a format of the image sensor, which may be referred to herein as "raw," such as "a raw image," "raw image data," "raw data," "a raw signal," or "a raw image signal." For example, the raw image signal may be in a format such as RGB format, which may represent individual pixels using a combination of values or components, such as a red component (R), a green component (G), and a blue component (B). In another example, the raw image signal may be in a Bayer format, wherein each pixel may be one of a combination of adjacent pixels, such as a combination of four adjacent pixels, of a Bayer pattern. For clarity, a sequence of pixels forming a Bayer pattern may be referred to herein as a Bayer. In some implementations, the ISP 500 may convert the raw image data (RGB data) to another format, such as a format expressing individual pixels using a combination of values or components, such as a luminance, or luma, value (Y), a blue chrominance, or chroma, value (U or Cb), and a red chroma value (V or Cr), such as the YUV or YCbCr formats.

The ISP 500 may include a front ISP (Front ISP) 510, or multiple front ISPs as shown; a local motion estimation (LME) unit 520; a local motion compensation (LMC) unit 522; a global motion compensation (GMC) unit 524; a high dynamic range (HDR) unit 530; a three-dimensional noise reduction (3DNR) unit 540, which may include a temporal noise reduction (TNR) unit 542 and a raw to raw (R2R) unit 544; a raw to YUV (R2Y) unit 550; a YUV to YUV (Y2Y) unit 560; a warp and blend unit 570; a stitching cost unit 580; a scaler 585; an image signal processing bus (ISP BUS) 590; a configuration controller 595; or a combination thereof.

Although not shown expressly in FIG. 5, in some implementations, one or more of the front ISP 510, the local motion estimation unit 520, the local motion compensation unit 522, the global motion compensation unit 524, the high dynamic range unit 530, the three-dimensional noise reduction unit 540, the temporal noise reduction unit 542, the raw to raw unit 544, the raw to YUV unit 550, the YUV to YUV unit 560, the warp and blend unit 570, the stitching cost unit 580, the scaler 585, the image signal processing bus 590, the configuration controller 595, or any combination thereof, may include a respective clock, power domain, or both.

In some implementations, the front ISP 510 may minimally process image signals received from respective image sensors, which may include image scaling. Scaling, by the front ISP 510, may include processing pixels, such as a defined cardinality of pixels, corresponding to a determined quality. For example, the front ISP 510 may correct dead pixels, perform band processing, decouple vertical blanking, or a combination thereof. In some implementations, the front ISP 510 may output a high-resolution frame; one or more downscaled, or reduced, resolution frames, such as a ½×½ resolution frame, a ¼×¼ resolution frame, a ⅛×⅛ resolution frame, a 1/16×1/16 resolution frame, a 1/32×1/32 resolution frame; or any combination thereof.

In some implementations, a multiple-camera apparatus may include multiple image capture devices, such as the image capture device 300 shown in FIG. 3, and may include a respective front ISP 510 associated with each image capture device.

The local motion estimation unit 520 may receive, or otherwise access, an input frame, or one or more portions thereof, which may be a current input frame, such as via the image signal processing bus 590. In some implementations, the local motion estimation unit 520 may receive the current input frame at a downscaled, or reduced, resolution. In some implementations, such as implementations implementing high dynamic range image processing, the current input frame may be a long exposure input frame.

The local motion estimation unit 520 may receive, or otherwise access, a reference frame, or one or more portions thereof, such as via the image signal processing bus 590. The reference frame may be a previously generated motion compensated prior frame, which may be associated with a temporal location preceding a temporal location associated with the current input frame. For example, the reference frame may be a recirculated frame from the temporal noise reduction unit 542. In some implementations, such as implementations including high dynamic range image processing, the reference frame may be a short exposure input frame corresponding to the long exposure current input frame.

In some implementations, the local motion estimation unit 520 may receive, or otherwise access, previously generated motion information, such as previously generated motion vectors for the current input frame or motion information for a previously processed frame.

The local motion estimation unit 520 may determine motion information, such as motion vectors, representing motion between the current input frame and the reference frame, such as motion caused by moving objects in the field-of-view or non-rotational motion, or translation, of the field-of-view. The local motion estimation unit 520 may output the motion information. For example, the local motion estimation unit 520 may output motion vectors to the local motion compensation unit 522.

The local motion compensation unit 522 may receive, or otherwise access, the reference frame, or one or more portions thereof, such as via the image signal processing bus 590. For example, in some implementations, such as implementations implementing high dynamic range image processing, the reference frame may be the short exposure input frame. In another example, in some implementations implementing high dynamic range image processing, the reference frame may be the long exposure input frame.

The local motion compensation unit 522 may receive, or otherwise access, motion information, such as motion vectors, associated with the current input frame. For example, the local motion compensation unit 522 may receive the motion vectors from the local motion estimation unit 520.

The local motion compensation unit 522 may apply the motion vectors to the reference frame, or one or more portions thereof, which may align or partially align the reference frame, or one or more portions thereof, with the current input frame, or one or more portions thereof. The local motion compensation unit 522 may output a local motion compensated reference frame, or one or more portions thereof.

The global motion compensation unit 524 may receive, or otherwise access, the reference frame, or one or more portions thereof, such as via the image signal processing bus 590. For example, in some implementations, such as implementations implementing high dynamic range image processing, the reference frame may be the short exposure input frame. In another example, in some implementations implementing high dynamic range image processing, the reference frame may be the long exposure input frame.

The global motion compensation unit 524 may receive, or otherwise access, global motion information, such as global motion information from a gyroscopic unit of the image capture device, such as a gyroscopic sensor included in the metadata unit 332 shown in FIG. 3, corresponding to the current input frame. The global motion information may indicate a rotational change in the orientation of the field-of-view relative to the content captured in respective images. For example, the global motion information may indicate a horizontal change of the field-of-view, which may indicate that the corresponding camera panned or rotated around a vertical axis. In another example, the global motion information may indicate a vertical change of the field-of-view, which may indicate that the camera is tilted or rotated around an axis perpendicular to the lens. In another example, the global motion information may indicate a rotational change of the field-of-view relative to the horizon, which may indicate that the camera rolled or rotated around an axis parallel to the lens. The global motion information may be distinct from motion information, such as translation motion information, indicating a change in the geospatial location of the image capture device, which may include a change associated with changing an elevation of the image capture device. In some embodiments, other changes affecting the frame, such as zooming, may be included as global motion.

The global motion compensation unit 524 may apply the global motion information to the reference frame, or one or more portions thereof, which may align or partially align the reference frame, or one or more portions thereof, with the current input frame, or one or more portions thereof. The global motion compensation unit 524 may output a global motion compensated reference frame, or one or more portions thereof.

The high dynamic range (HDR) unit 530 may receive, or otherwise access, the current input frame, or one or more portions thereof, such as from the front ISP 510. The current input frame may be a long exposure input frame corresponding to the short exposure reference frame. The high dynamic range unit 530 may receive, or otherwise access, the local motion compensated reference frame from the local motion compensation unit 522. The high dynamic range unit 530 may receive, or otherwise access, the global motion compensated reference frame from the global motion compensation unit 524.

The high dynamic range (HDR) unit 530 may generate a high dynamic range image based on the current input image and the local motion compensated reference frame, the global motion compensated reference frame, or a combination thereof. For example, for each portion of the reference frame, such as each block, each pixel, or each Bayer, the HDR unit 530 may identify a value for the portion based on the corresponding portion of the local motion compensated reference frame or the corresponding portion of the global motion compensated reference frame.

The high dynamic range (HDR) unit 530 may output the high dynamic range image. For example, the HDR unit 530 may output the high dynamic range image by storing the high dynamic range image in memory, such as shared memory, via the image signal processing bus 590, or the HDR unit 530 may output the high dynamic range image directly to another unit of the ISP 500, such as the temporal noise reduction unit 542. In some implementations, the HDR unit 530 may be omitted, or high dynamic range processing by the HDR unit 530 may be omitted.

The three-dimensional noise reduction unit 540 may include the temporal noise reduction (TNR) unit 542, the raw to raw (R2R) unit 544, or both.

The temporal noise reduction unit 542 may receive the current input frame, or one or more portions thereof, such as from the front ISP 510 or via the image signal processing bus 590. In some implementations, such as implementations implementing high dynamic range image processing, the temporal noise reduction unit 542 may receive the high dynamic range input frame, or one or more portions thereof, such as from the high dynamic range unit 530, as the current input frame.

The temporal noise reduction unit 542 may receive, or otherwise access, the local motion compensated reference frame from the local motion compensation unit 522. The temporal noise reduction unit 542 may receive, or otherwise access, the global motion compensated reference frame from the global motion compensation unit 524.

The temporal noise reduction unit 542 may reduce temporal noise in the current input frame, which may include recursively reducing temporal noise in a sequence of input images, such as a video. Recursive temporal noise reduction may include combining a current image with noise feedback information corresponding to a previously processed frame, such as the reference frame, which may be a recirculated frame. For example, the reference frame may be the local motion compensated frame output by the local motion compensation unit 522, the global motion compensated frame output by the global motion compensation unit 524, or a combination thereof. For example, for each portion of the reference frame, such as each block, each pixel, or each Bayer, the temporal noise reduction unit 542 may identify a value for the portion based on the corresponding portion of the local motion compensated reference frame or the corresponding portion of the global motion compensated reference frame.

The temporal noise reduction unit 542 may generate output, including a pixel value and associated noise variance for the pixel value for one or more pixels of the current input frame.

The raw to raw unit 544 may perform spatial denoising of frames of raw images based on noise variance values received from the temporal noise reduction unit 542. For example, spatial denoising in the raw to raw unit 544 may include multiple passes of image signal processing, including passes at various resolutions.

The raw to YUV unit 550 may demosaic and/or color process the frames of raw images, which may include representing each pixel in the YUV format, which may include a combination of a luminance (Y) component and two chrominance (UV) components.

The YUV to YUV unit 560 may perform local tone mapping of YUV images. In some implementations, the YUV to YUV unit 560 may include multiscale local tone mapping using a single pass approach or a multi-pass approach on a frame at different scales.

The warp and blend unit 570 may warp images, blend images, or both. In some implementations, the warp and blend unit 570 may warp a corona around the equator of each frame to a rectangle. For example, the warp and blend unit 570 may warp a corona around the equator of each frame to a rectangle based on the corresponding low-resolution frame generated by the front ISP 510.

The warp and blend unit 570 may apply one or more transformations to the frames. In some implementations, spherical images produced by a multi-face camera device may be warped and/or blended by the warp and blend unit 570 to correct for distortions at image edges. In some implementations, the warp and blend unit 570 may apply a transformation that is subject to a close to identity constraint, wherein a location of a pixel in an input image to the warp and blend unit 570 may be similar to (such as within a defined distance threshold of) a location of a corresponding pixel in an output image from the warp and blend unit 570. For example, the warp and blend unit 570 may include an internal memory, which may have a size, such as 300 lines, which may be smaller than a size of a frame, and the warp and blend unit 570 may process the input image data in raster-in/raster-out order using a transformation that is subject to a close to identity constraint.

In some implementations, the warp and blend unit 570 may apply a transformation that is independent of close to identity constraints, which may include processing the input image data in raster-in/dynamic-out or dynamic-in/raster-out order. For example, the warp and blend unit 570 may transform two or more non-rectilinear (fisheye) images to generate a combined frame, such as an equirectangular frame, by processing the input image data in raster-in/dynamic-out or dynamic-in/raster-out order.

The stitching cost unit 580 may generate a stitching cost map as an output. In some implementations, the cost map may be represented as a rectangle having disparity x and longitude y based on a warping. Each value of the cost map may be a cost function of a disparity x value for a corresponding longitude. Cost maps may be generated for various scales, longitudes, and disparities.

The scaler 585 may scale images received from the output of the warp and blend unit 570, which may be in patches, or blocks, of pixels, such as 16×16 blocks, 8×8 blocks, or patches or blocks of any other size or combination of sizes.

The image signal processing bus 590 may be a bus or interconnect, such as an on-chip interconnect or embedded microcontroller bus interface, for communication between the front ISP 510, the temporal noise reduction unit 542, the local motion compensation unit 522, the raw to raw unit 544, the raw to YUV unit 550, the YUV to YUV unit 560, the combined warp and blend unit 570, the stitching cost unit 580, the scaler 585, the configuration controller 395, or any combination thereof.

The configuration controller 595 may coordinate image processing by the front ISP 510, the local motion estimation unit 520, the local motion compensation unit 522, the global motion compensation unit 524, the high dynamic range unit 530, the three-dimensional noise reduction unit 540, the temporal noise reduction unit 542, the raw to raw unit 544, the raw to YUV unit 550, the YUV to YUV unit 560, the warp and blend unit 570, the stitching cost unit 580, the scaler 585, the image signal processing bus 590, or any combination thereof, of the ISP 500. For example, the configuration controller 595 may control camera alignment model calibration, auto-exposure, auto-white balance, or any other camera calibration or similar process or combination of processes. In some implementations, the configuration controller 595 may be a microcontroller. The configuration controller 595 is shown in FIG. 5 using broken lines to indicate that the configuration controller 595 may be included in the ISP 500 or may be external to, and in communication with, the ISP 500. The configuration controller 595 may include a respective clock, power domain, or both.

An approach to multiscale video denoising may be to decompose the input video frame with some type of multiscale decomposition, denoise each scale, and reconstruct the result from the estimates of the coarsest to the finest scales. Examples of some types of multiscale decomposition include Gaussian and Laplacian pyramids.

Figure 6:
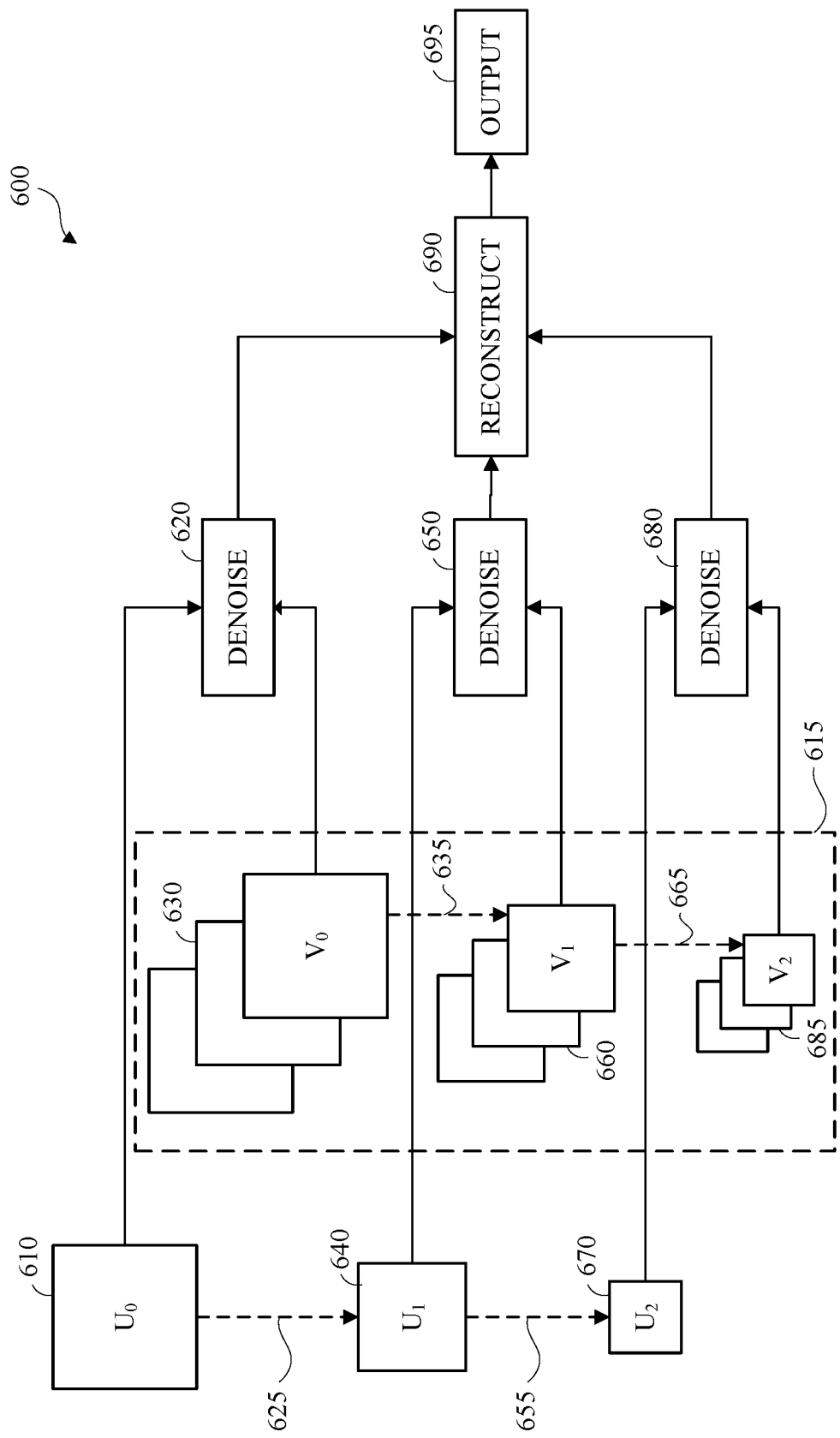
FIG. 6 is an overview diagram of a parallel multiscale video denoising method in accordance with implementations of this disclosure.

FIG. 6 is a diagram of an example of a parallel multiscale video denoising method 600. In this example, an input video frame 610 is decomposed in a Gaussian pyramid where all the sub-frames are denoised separately. The input video frame 610 may be referred to as a reference frame. As shown in FIG. 6, frames in a temporal buffer 615 are decomposed in a Gaussian pyramid where all the sub-frames are denoised separately. The frames in the temporal buffer include one or more frames that are adjacent to the input video frame 610. For example, the frames in the temporal buffer 615 include one or more frames temporally preceding the input video frame 610, one or more frames temporally subsequent to the input video frame 610, or both.

The input video frame 610 may be preprocessed, for example, to adjust color balance, white balance, or both. The input video frame is denoised at operation 620 and downscaled at operation 625. One or more frames 630 adjacent to the input video frame 610 are each denoised at operation 620 and downscaled at operation 635. The result of the downscaling at operation 625 may be referred to as sub-frame 640. Sub-frame 640 is denoised at operation 650 and downscaled at operation 655. One or more frames 660 adjacent to the sub-frame 640 are each denoised at operation 650 and downscaled at operation 665. The result of the downscaling at operation 655 may be referred to as sub-frame 670. Sub-frame 670 is denoised at operation 680. One or more frames 685 adjacent to the sub-frame 670 is denoised at operation 680. For simplicity, FIG. 6 shows two downscaling operations, and the number of downscaling operations may vary and is not limited to the number shown in FIG. 6. The result of the denoising at operation 620, the result of the denoising at operation 650, and the result of the denoising at operation 680 are reconstructed at operation 690, which results in the output 695. The output 695 may be estimated as $\hat{u}_0=\hat{u}$. The output 695 is reconstructed according to Equation (1) below.

$$\hat{u}_k = \bar{u}_k - \mathcal{U}(\mathcal{D}(\bar{u}_k)) + \mathcal{U}(\bar{u}_{k+1}), \text{ for } k=K-2 \text{ to } 0 \quad \text{Equation (1)}$$

Equation (1) is initialized with $\hat{u}_{k-1}=\bar{u}_{k-1}$ where $\bar{u}_k$ is the denoised version of the sub-image $u_k$, and where $\mathcal{D}$ and $\mathcal{U}$ are the downscaling and upscaling operators, respectively.

The pyramidal frameworks disclosed herein may depend on the downscaling operator $\mathcal{D}$ and the upscaling operator $\mathcal{U}$. The downscaling operator $\mathcal{D}$ may apply a low-pass filtering prior to decimation:

$$\mathcal{D}(v) = (\downarrow 2)(h*v) \quad \text{Equation (2)}$$

where h is a linear low-pass filter, and downsampling ($\downarrow 2$) is defined as:

$$(\downarrow 2)(v)[i] = v[2i] \quad \text{Equation (3)}$$

The upscaling operator $\mathcal{U}$ may be defined as:

$$\mathcal{U}(v) = 4 \cdot h * [(\uparrow 2)v] \quad \text{Equation (4)}$$

where upsampling ($\uparrow 2$) is:

$$(\uparrow 2)(v)[i] = \begin{cases} v[i/2] & \text{if } i \text{ is even} \\ 0 & \text{if } i \text{ is odd} \end{cases} \quad \text{Equation (5)}$$

The upscaling operator inserts a zero in between adjacent pixels, upon which the result may be multiplied by 4 to preserve the mean image intensity. Examples of separable low-pass filters h are shown in Table 1.

TABLE 1

| Size | h |
|------|---|
| 2 × 2 | [½, ½]$^T$ · [½, ½] |
| 3 × 3 | [¼, ½, ¼]$^T$ · [¼, ½, ¼] |
| 5 × 5 | [1/16, 4/16, 6/16, 4/16, 1/16]$^T$ · [1/16, 4/16, 6/16, 4/16, 1/16] |

For example, performing an upscaling operation with the 2×2 kernel results in pixel duplications, while using the 3×3 filter results in a bilinear interpolation.

The parallel multiscale video denoising method 600 of FIG. 6 may apply the following algorithm. For simplicity, the algorithm is shown for one frame, although more frames may be employed. The video (spatiotemporal) denoising performed at each scale is referred to as denoising $(u_k, v_k)$.

In this example, the input may be a frame $\tilde{u}$, frames in a temporal buffer $\tilde{v}$, and K number of scales. The output may be a restored frame $\hat{u}$.

Initialization:
$u_0 = \tilde{u}$, $v_0 = \hat{v}$
Gaussian Pyramid Decomposition of $\tilde{u}$:
for k=1 to K−1 do $u_k \leftarrow \mathcal{D}(u_{k-1})$ $\mathcal{G}_u = \{u_0, \ldots, u_{K-1}\}$
Gaussian Pyramid Decomposition of $\tilde{v}$:
for k=1 to K−1 do $v_k \leftarrow \mathcal{D}(v_{k-1})$ $\mathcal{G}_v = \{v_0, \ldots, v_{K-1}\}$
Parallel Video Denoising:

$\bar{u}_k \leftarrow \text{denoising}(u_k, v_k)$, for $0 \le k \le K-1$

Figure 7:
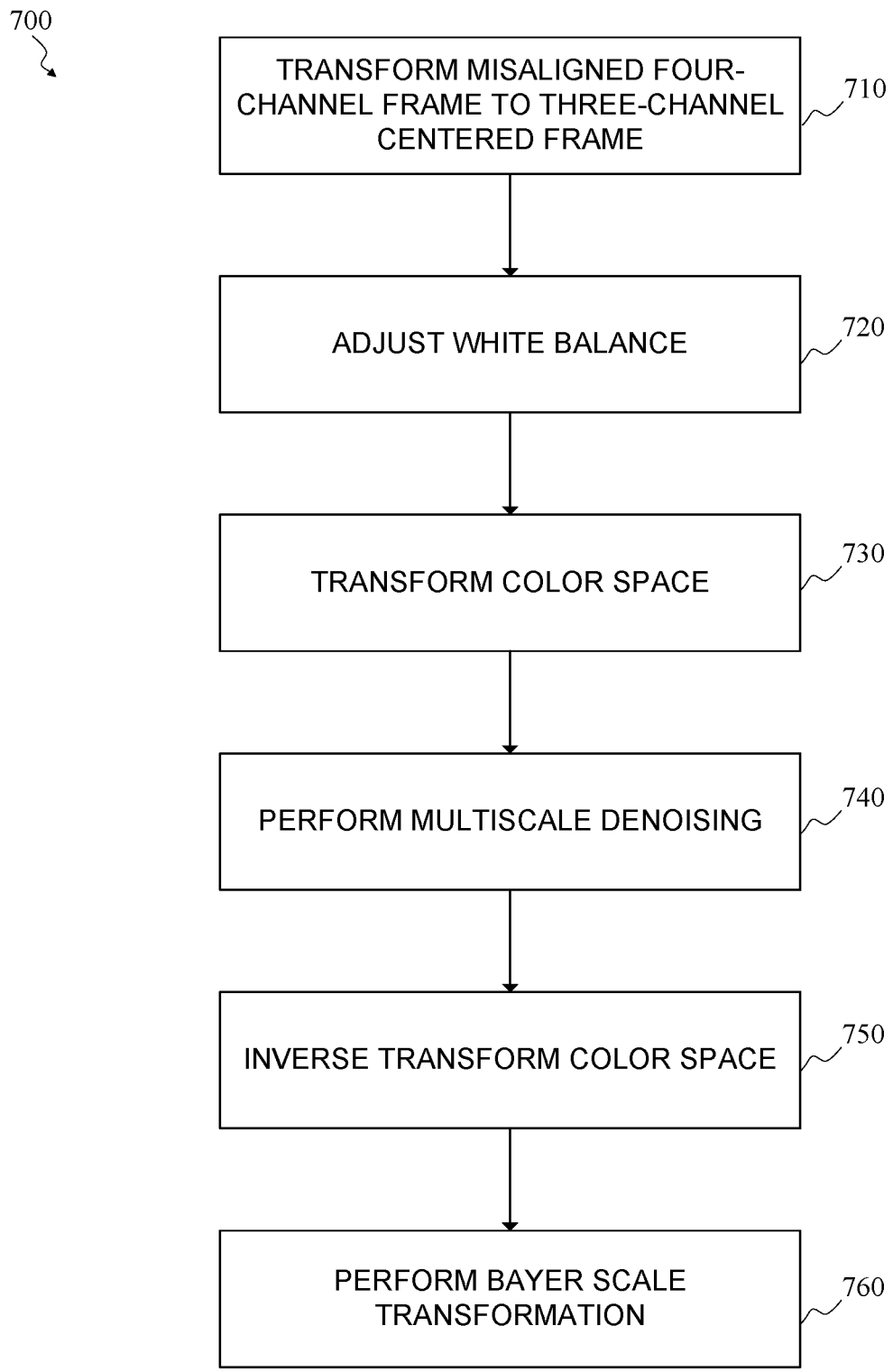
FIG. 7 is a block diagram of pre-processing method for a video frame for multiscale video denoising in accordance with implementations of this disclosure.

Reconstruction:

$\hat{u}_{K-1} \leftarrow \bar{u}_{K-1}$ for k=K−2 to 0 do $\hat{u}_k \leftarrow \bar{u}_k - \mathcal{U}(\mathcal{D}(\bar{u}_k)) + \mathcal{U}(\bar{u}_{k+i})$ return $\hat{u} = \hat{u}_0$ FIG. 7 is a block diagram of pre-processing method 700 for a video frame for multiscale video denoising in accordance with implementations of this disclosure. In this example, the multiscale video denoising pipe 700 receives a four-channel Bayer scale video frame ($G_r^{bayer}$, $R^{bayer}$, $B^{bayer}$, $G_b^{bayer}$) as an input. The four-channel Bayer scale video frame is a noisy frame that is misaligned. In this example, the noise at neighboring pixels in the four-channel Bayer scale frame is independent, meaning that the pixels are not correlated in terms of neighboring pixel noise.

Referring to FIG. 7, the misaligned four-channel Bayer scale frame is transformed into an (R, G, B) centered frame at operation 710. The transformation may be performed in accordance with Equation (6) below.

$$\begin{cases} R(i,j) = (9 \cdot R^{bayer}(i,j) + 3 \cdot R^{bayer}(i, j-1) \\ \quad + 3 \cdot R^{bayer}(i+1, j) + R^{bayer}(i+1, j-1))/16 \\ G(i,j) = (G_r^{bayer}(i,j) + G_b^{bayer}(i,j))/2 \\ B(i,j) = (9 \cdot B^{bayer}(i,j) + 3 \cdot B^{bayer}(i, j+1) \\ \quad + 3 \cdot B^{bayer}(i-1, j) + R^{bayer}(i-1, j+1))/16 \end{cases} \quad \text{Equation (6)}$$

The pre-processing method 700 continues to operation 720 to adjust the white balance of the transformed (R, G, B) centered frame. At operation 720, the colors in the transformed (R, G, B) centered frame are globally adjusted by multiplying each channel separately for weights $\lambda_R$, $\lambda_G$, $\lambda_B$. The white balance may be adjusted in accordance with Equation (7) below.

$$\begin{pmatrix} R' \\ G' \\ B' \end{pmatrix} = \begin{pmatrix} \lambda_R & 0 & 0 \\ 0 & \lambda_G & 0 \\ 0 & 0 & \lambda_B \end{pmatrix} \cdot \begin{pmatrix} R \\ G \\ B \end{pmatrix} \quad \text{Equation (7)}$$

The pre-processing method 700 continues to operation 730 to transform the color space. At operation 730, the working space may be changed from (R, G, B) to (Y, $C_b$, $C_r$) to allow for separate denoising of chroma and luma in a more efficient manner. The applied transformation may be performed in accordance with Equation (8) below.

$$\begin{pmatrix} Y \\ C_b \\ C_r \end{pmatrix} = \begin{pmatrix} 0.299 & 0.587 & 0.114 \\ -0.1687 & -0.3313 & 0.5 \\ 0.5 & -0.4187 & -0.0813 \end{pmatrix} \begin{pmatrix} R \\ G \\ B \end{pmatrix} + \begin{pmatrix} 0 \\ 0.5 \\ 0.5 \end{pmatrix} \quad \text{Equation (8)}$$

The pre-processing method 700 continues to operation 740 to perform multiscale denoising. The multiscale denoising at operation 740 may be based on the example method 600 shown in FIG. 6, in which the input frame is first decomposed in a Gaussian pyramid and all the sub-frames of the pyramid are independently denoised starting from the coarsest scale to the finest scale. At operation 750, the multiscaled denoised frame is inverse transformed to transform the frame from (Y, $C_b$, $C_r$) to (R, G, B). At operation 760, the (R, G, B) frame is transformed to a four-channel ($G_r^{bayer}$, $R^{bayer}$, $B^{bayer}$, $G_b^{bayer}$) frame.

In accordance with implementations of this disclosure, the variance of the noise at the input of the denoising operation in scale k may be expressed in terms of the variance of the noise of a frame with uncorrelated pixels, for example, an image $I^{bayer}$ at Bayer scale. For example, for an input frame $I_k$ of the denoising operation k, for a pixel $I_k[i, j, c]$ at position i, j in the color channel c, the methods and systems trace back which pixels in the Bayer scale frame $I^{bayer}$ contribute to the value of the pixel $I_k[i, j, c]$. In other words, the methods and systems are configured to backtrace the coefficients $w_{i,j,c}[k, l, m]$ of a weight matrix $W_{i,j,c}$, such that $I_k[i, j, c] = W_{i,j,c} \cdot I^{bayer}$. It may then be possible to determine the variance of the noise $\sigma_k^2[i, j, c]$ at pixel $I_k[i, j, c]$ as a linear combination of the noise variance $\sigma_{bayer}^2[k, l, m]$ of the pixels $I^{bayer}[k, l, m]$ at Bayer scale and coefficients $w_{i,j,c}[k, l, m]$, for example, $\sigma_k^2[i, j, c] = \Sigma_{k,l,m} w_{i,j,c}^2[k, l, m] \sigma_{bayer}^2[k, l, m]$. In some implementations, this determination may only be performed on the frame $I^{bayer}$ at Bayer scale when it is the only frame in the pipe with uncorrelated pixels.

Figure 8:
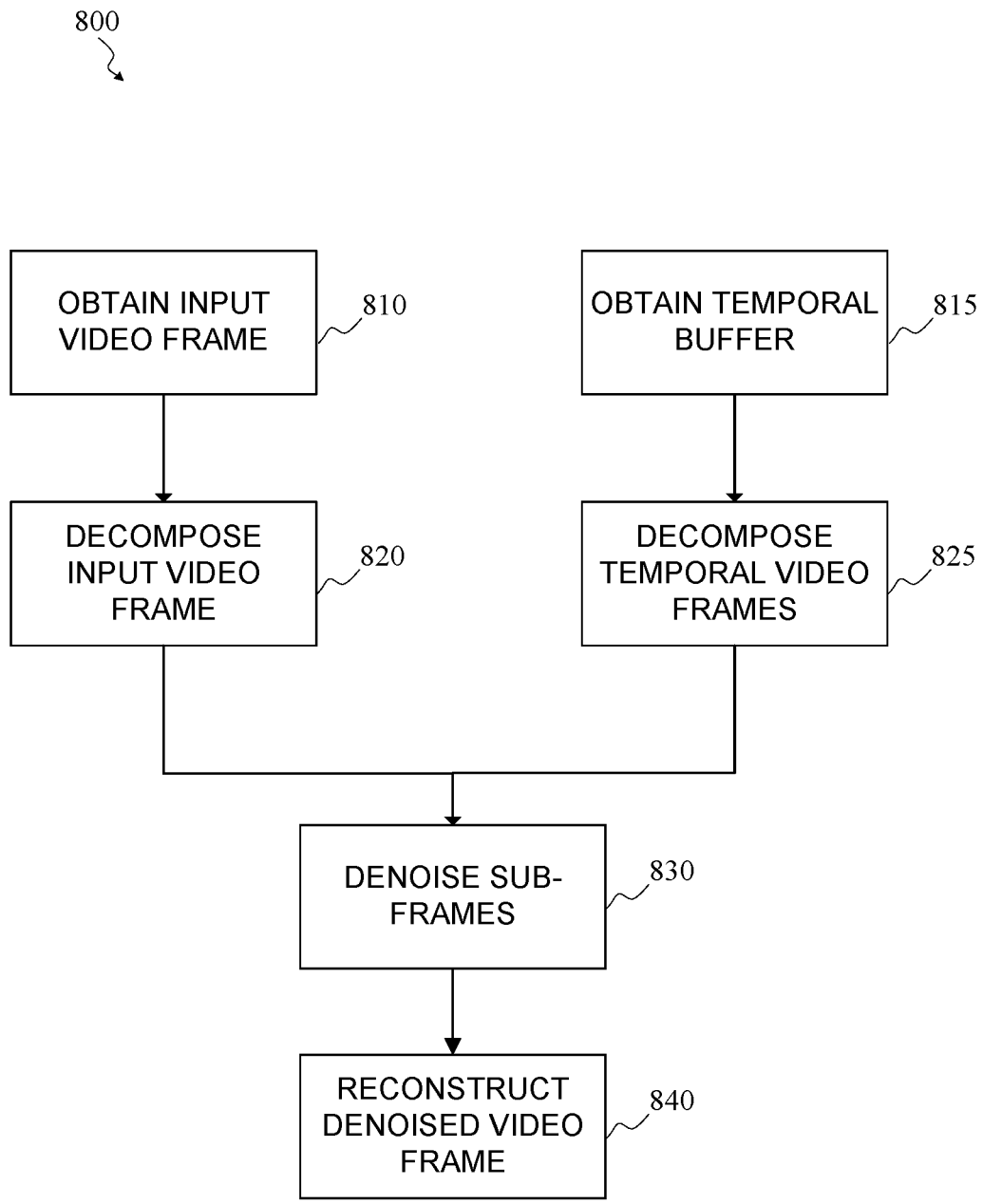
FIG. 8 is a block diagram of a multiscale video denoising method in accordance with implementations of this disclosure.

FIG. 8 is a block diagram of a method for multiscale video denoising 800 in accordance with embodiments of this disclosure. Multiscale video denoising 800 includes obtaining an input video frame 810. The input video frame may be referred to as a reference frame. Multiscale video denoising 800 includes obtaining a temporal buffer 815. The temporal buffer may be associated with the input video frame. The temporal buffer may include one or more temporally preceding video frames relative to the input video frame, one or more temporally subsequent video frames relative to the input video frame, or both. Multiscale video denoising 800 includes decomposing the input video frame into a plurality of sub-frames 820. Each input video frame may be decomposed into a Gaussian pyramid. The plurality of sub-frames may range from a coarse scale to a fine scale. Multiscale video denoising 800 includes decomposing each of the one or more temporally preceding video frames, the one or more temporally subsequent video frames, or both, into a plurality of respective temporal sub-frames 825. Each frame in the temporal buffer may be decomposed into a Gaussian pyramid. The plurality of respective temporal sub-frames may range from a coarse scale to a fine scale. Multiscale video denoising 800 includes denoising each of the plurality of sub-frames and each of the plurality of respective temporal sub-frames 830 from the coarse scale to the fine scale. Each scale may be denoised separately using a spatiotemporal denoising algorithm, for example, VNLM. At each scale, a denoised version of the reference sub-image may be estimated. To obtain the estimate, the spatiotemporal algorithm may use the information contained in the reference sub-image and the sub-images of the temporal buffer. The denoising of each of the plurality of sub-frames and each of the plurality of respective temporal sub-frames 835 may be performed independently to obtain a denoised sub-image at each scale. For example, once the pyramids of the reference frame and the temporal buffer are constructed, each scale may be denoised without using information contained in adjacent scales. Multiscale video denoising 800 includes reconstructing a denoised video frame 840. The reconstructed video frame may be based on the plurality of denoised sub-frames and the plurality of denoised respective temporal subframes. For example, multiscale video denoising 800 denoises each scale separately and then reconstructs the denoised video frame 840 bottom-up with the denoised sub-images (as in Eq. 1).

In some implementations, the method for multiscale video denoising 800 may include upscaling each of the one or more sub-frames, the one or more respective temporal sub-frames, or both. The upscaling may be performed subsequent to the denoising. The method for multiscale video denoising may include determining one or more respective details for each of the one or more sub-frames, and one or more respective temporal sub-frames, or both, by subtracting a respective upscaled sub-frame from a color space transformed frame. The method for multiscale video denoising 800 may include combining each of the one or more respective details with a respective upscaled sub-frame of an adjacent scale.

In some implementations, the method for multiscale video denoising 800 may include determining, for each of the input video frame, the temporally preceding video frame, and the temporally subsequent video frame, a first noise estimate based on each respective three-channel centered video frame. The method for multiscale video denoising 800 may include multiplying each channel of each respective three-channel centered video frame by a respective weight to adjust a white balance of each respective three-channel centered video frame. The method for multiscale video denoising 800 may include determining a second noise estimate based on each respective three-channel centered video frame and each respective white balance adjusted video frame. The method for multiscale video denoising 800 may include transforming, for each of the input video frame, the temporally preceding video frame, and the temporally subsequent video frame, the RGB color space to a YCbCr color space to produce a respective color transformed video frame. The method for multiscale video denoising 800 may include determining a third noise estimate based on each respective white balance adjusted video frame and each respective color transformed video frame. The method for multiscale video denoising 800 may include combining the first noise estimate, the second noise estimate, and the third noise estimate with each respective noise estimate and each respective sub-frame prior to denoising.

Results of a comparative study between the single scale and the multiscale versions of the video denoising algorithm are shown in Table 2 below. In this example, a VNLM-based denoising algorithm was used in both the single scale and the multiscale versions. The patch size in this example was set to 5×5, while the size of the three-dimensional search neighborhood was set to 3×3×5. In this example, four frames were used in the temporal buffer. Five different sequences of various resolutions consisting of nine frames each were contaminated with white Gaussian noise, and were then denoised with both the single scale and multiscale algorithms.

TABLE 2

| σ | Sequence | | PSNR (dB) |
|---|---|---|---|
| 10 | Bus | Single scale | 31.77 |
| | | Multiscale | 31.83 |
| | Sandski | Single scale | 34.36 |
| | | Multiscale | 34.59 |
| | Foreman | Single scale | 35.52 |
| | | Multiscale | 35.51 |
| | Tennis | Single scale | 30.75 |
| | | Multiscale | 30.40 |
| | Salesman | Single scale | 33.90 |
| | | Multiscale | 33.77 |
| | Mean | Single scale | 33.26 |
| | | Multiscale | 33.22 |
| 20 | Bus | Single scale | 27.66 |
| | | Multiscale | 27.87 |
| | Sandski | Single scale | 30.19 |
| | | Multiscale | 30.60 |
| | Foreman | Single scale | 31.52 |
| | | Multiscale | 31.82 |
| | Tennis | Single scale | 26.60 |
| | | Multiscale | 26.37 |
| | Salesman | Single scale | 30.04 |
| | | Multiscale | 29.88 |
| | Mean | Single scale | 29.21 |
| | | Multiscale | 29.32 |
| 30 | Bus | Single scale | 25.31 |
| | | Multiscale | 25.64 |
| | Sandski | Single scale | 27.72 |
| | | Multiscale | 28.29 |
| | Foreman | Single scale | 29.21 |
| | | Multiscale | 29.62 |
| | Tennis | Single scale | 24.98 |
| | | Multiscale | 24.91 |
| | Salesman | Single scale | 27.94 |
| | | Multiscale | 27.82 |
| | Mean | Single scale | 27.04 |
| | | Multiscale | 27.27 |

As shown in Table 2, utilizing the multiscale framework results in an improvement in peak signal-to-noise ratio (PSNR) in the majority of cases. PSNR is a quality metric that may be defined as follows.

$$PSNR = 10 \cdot \log_{10}\left(\frac{MAX_u^2}{MSE}\right) \quad \text{Equation (9)}$$

where $MAX_u$ is the maximum value that the image may have (i.e., 255 for an 8-bit image), and MSE is the mean squared error. Given a noise-free image u of size m×n and its noisy approximation ũ, the MSE may be defined as:

$$MSE = \frac{1}{mn}\sum_{i=0}^{m-1}\sum_{j=0}^{n-1}[u(i,j) - \tilde{u}(i,j)]^2 \quad \text{Equation (10)}$$

Higher PSNR values indicate higher quality. This improvement is accentuated for larger values of noise. Accordingly, the employment of the multiscale framework improves PSNR values compared to single scale video denoising. A benefit of multiscale denoising may be the gain in visual quality obtained by the removal of low-frequency noise in flat areas. The reduction of low-frequency noise may result in less flickering in some cases. In some examples, the multiscale framework may be combined with motion compensation to align the frames in the temporal buffer with respect to the reference frame prior to denoising.

Where certain elements of these implementations may be partially or fully implemented using known components, only those portions of such known components that are necessary for an understanding of this disclosure have been described. Detailed descriptions of other portions of such known components have been omitted so as not to obscure the disclosure.

An implementation showing a singular component in this disclosure should not be considered limiting; rather, this disclosure is intended to encompass other implementations including a plurality of the same component, and vice-versa, unless explicitly stated otherwise herein. Further, this disclosure encompasses present and future known equivalents to the components referred to herein by way of illustration.

As used herein, the terms "image capture device," "imaging device," and "camera" may be used to refer to any imaging device or sensor configured to capture, record, and/or convey still and/or video imagery that may be sensitive to visible parts of the electromagnetic spectrum, invisible parts of the electromagnetic spectrum (e.g., infrared, ultraviolet), and/or other energy (e.g., pressure waves).

While certain aspects of the implementations described herein are described in terms of a specific sequence of operations of a method, these descriptions are illustrative only of the broader methods of the disclosure and may be modified as required by the particular applications thereof. Certain operations may be rendered unnecessary or optional under certain circumstances. Additionally, certain operations or functionality may be added to the disclosed implementations, or the order of performance of two or more operations may be permuted. All such variations are considered to be encompassed within the disclosure.

While the above detailed description has shown, described, and pointed out novel features of the disclosure as applied to various implementations, it will be understood that various omissions, substitutions, and changes in the form and details of the devices or processes illustrated may be made by those skilled in the art without departing from the disclosure. The foregoing description is in no way meant to be limiting, but rather should be taken as illustrative of the general principles of the technologies disclosed.

What is claimed is:

1. A method for denoising an input video frame, the method comprising:
   obtaining an input video frame;
   obtaining a temporal buffer associated with the input video frame, wherein the temporal buffer includes a temporally preceding video frame relative to the input video frame and a temporally subsequent video frame relative to the input video frame;
   decomposing the input video frame into a plurality of sub-frames ranging from a coarse scale to a fine scale;
   decomposing the temporally preceding video frame and the temporally subsequent video frame into a plurality of respective temporal sub-frames ranging from a coarse scale to a fine scale;
   independently denoising each of the plurality of sub-frames and each of the plurality of respective temporal sub-frames from the coarse scale to the fine scale; and
   reconstructing a denoised video frame based on the plurality of denoised sub-frames and the plurality of denoised respective temporal sub-frames.

2. The method of claim 1, wherein decomposing the input video frame is based on a Gaussian pyramid.

3. The method of claim 1, wherein decomposing the temporally preceding video frame and the temporally subsequent video frame is based on a Gaussian pyramid.

4. The method of claim 1, further comprising:
upscaling each of the plurality of sub-frames and the plurality of respective temporal sub-frames.

5. The method of claim 4, further comprising:
determining a plurality of respective details for each of the plurality of sub-frames and the plurality of respective temporal sub-frames by subtracting a respective upscaled sub-frame from a color space transformed frame.

6. The method of claim 5, further comprising:
combining each respective plurality of details with a respective upscaled sub-frame of an adjacent scale.

7. The method of claim 6, wherein the adjacent scale is a coarser scale.

8. The method of claim 6, wherein the combining is performed prior to independently denoising each of the plurality of sub-frames and the plurality of respective temporal sub-frames.

9. An image capture device comprising:
an image sensor configured to obtain an input video frame;
a memory configured to store a temporal buffer, wherein the temporal buffer includes a temporally preceding video frame relative to the input video frame and a temporally subsequent video frame relative to the input video frame;
an image processor configured to:
decompose the input video frame into a plurality of sub-frames;
decompose the temporally preceding video frame and the temporally subsequent video frame into a plurality of respective temporal sub-frames;
denoise each of the plurality of sub-frames and each of the plurality of respective temporal sub-frames; and
reconstruct a denoised video frame based on the plurality of denoised sub-frames and the plurality of denoised respective temporal sub-frames; and
a display unit configured to display the denoised video frame.

10. The image capture device of claim 9, wherein the image processor is further configured to upscale each of the plurality of sub-frames and the plurality of respective temporal sub-frames.

11. The image capture device of claim 9, wherein the image processor is further configured to decompose the input video frame, the temporally preceding video frame, and the temporally subsequent video frame based on a Gaussian pyramid ranging from a coarse scale to a fine scale.

12. The image capture device of claim 11, wherein the image processor is further configured to denoise each of the plurality of sub-frames independently from the coarse scale to the fine scale.

13. The image capture device of claim 11, wherein the image processor is further configured to denoise each of the plurality of respective temporal sub-frames independently from the coarse scale to the fine scale.

14. The image capture device of claim 11, wherein the memory is further configured to store the denoised video frame.

15. An image capture device comprising:
an image sensor configured to obtain an input video frame;
a memory configured to store a temporal buffer, wherein the temporal buffer includes a temporally preceding video frame relative to the input video frame and a temporally subsequent video frame relative to the input video frame;
an image processor configured to:
transform the input video frame, the temporally preceding video frame, and the temporally subsequent video frame, from a misaligned four-channel image to a respective three-channel centered video frame, wherein each respective three-channel centered video frame has an RGB color space;
determine, for each of the input video frame, the temporally preceding video frame, and the temporally subsequent video frame, a first noise estimate based on each respective three-channel centered video frame;
multiply each channel of each respective three-channel centered video frame by a respective weight to adjust a white balance of each respective three-channel centered video frame;
determine a second noise estimate based on each respective three-channel centered video frame and each respective white balance adjusted video frame;
transform, for each of the input video frame, the temporally preceding video frame, and the temporally subsequent video frame, the RGB color space to a YCbCr color space to produce a respective color transformed video frame;
determine a third noise estimate based on each respective white balance adjusted video frame and each respective color transformed video frame;
decompose each respective color transformed video frame into a plurality of sub-frames ranging from a coarse scale to a fine scale,
determine a respective noise estimate for each of the plurality of sub-frames, wherein each respective noise estimate is based on a frame at a present scale and an image of an adjacent scale;
independently denoise each of the plurality of sub-frames from the coarse scale to the fine scale;
reconstruct the plurality of denoised sub-frames to produce a denoised video frame;
transform the YCbCr color space of the denoised video frame to the RGB color space to produce an inverse color space transformed video frame; and
transform the inverse color space transformed video frame to a Bayer scale video frame; and
a memory configured to store the Bayer scale video frame.

16. The image capture device of claim 15, wherein the image processor is further configured to combine the first noise estimate, the second noise estimate, and the third noise estimate with each respective noise estimate and each respective sub-frame prior to denoising.

17. The image capture device of claim 16, wherein the image processor is further configured to upscale each of the plurality of sub-frames.

18. The image capture device of claim 17, wherein the image processor is further configured to determine a plurality of respective details for each of the plurality of sub-frames by subtracting a respective upscaled sub-frame from the color transformed video frame.

19. The image capture device of claim 18, wherein the image processor is further configured to combine each respective plurality of details with a respective upscaled sub-frame of an adjacent scale.

20. The image capture device of claim 19, wherein the image processor is configured to combine each respective plurality of details with the respective upscaled sub-frame prior to denoising each of the plurality of sub-frames.

\* \* \* \* \*